US006369806B1

(12) United States Patent
Endo et al.

(10) Patent No.: US 6,369,806 B1
(45) Date of Patent: Apr. 9, 2002

(54) COORDINATE-DETECTING DEVICE AND COORDINATE INPUT PAD FOR USE IN COORDINATE-DETECTING DEVICE

(75) Inventors: Michiko Endo; Takeshi Nishino; Yasuo Ootani, all of Tokyo (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 0 days.

(21) Appl. No.: 09/290,186

(22) Filed: Apr. 13, 1999

(30) Foreign Application Priority Data

Apr. 20, 1998 (JP) .......................... 10-109172
Jan. 26, 1999 (JP) .......................... 11-017618

(51) Int. Cl.$^7$ ................................. G09G 5/08
(52) U.S. Cl. .................. 345/174; 345/173; 345/176; 345/177; 178/18.01; 178/18.03; 178/18.04; 178/18.05; 178/19.01; 178/19.02
(58) Field of Search .................. 178/18.05, 18.01, 178/18.03, 18.04, 19.01, 19.02; 345/173, 174, 176, 177

(56) References Cited

U.S. PATENT DOCUMENTS 3,933,187 A * 1/1976 Marlinski ................... 141/392
5,677,744 A * 10/1997 Yoneda et al. ................. 349/12
5,825,308 A * 10/1998 Rosenberg ..................... 341/20
5,854,451 A * 12/1998 Miyazaki et al. ........ 178/18.05
5,869,791 A * 2/1999 Young ..................... 178/20.01
5,889,511 A * 3/1999 Ong et al. ................... 345/173
5,995,084 A * 11/1999 Chan et al. ................. 345/173

FOREIGN PATENT DOCUMENTS

JP           62-67625           3/1987

* cited by examiner

Primary Examiner—Richard Hjerpe
Assistant Examiner—Jean Lesperance
(74) Attorney, Agent, or Firm—Staas & Halsey LLP

(57) ABSTRACT

A coordinate-detecting device of a voltage-detecting type, the device including: a coordinate input pad having an upper sheet and a lower sheet opposing each other at a predetermined gap, the sheets being in electrical contact when there is a touch on the coordinate input pad; a voltage-detecting part for alternately detecting voltage values representing an X-coordinate and a Y-coordinate of a contact point; and a control part for generating a coordinate data from the voltage values detected at the voltage-detecting part. The upper sheet and the lower sheet oppose each other at the predetermined gap by a repulsive force between magnetic poles with the same polarity.

41 Claims, 36 Drawing Sheets

LOAD

COORDINATE INPUT PAD MOUNTING SURFACE

COMPONENT MOUNTING SURFACE

FIG. 36
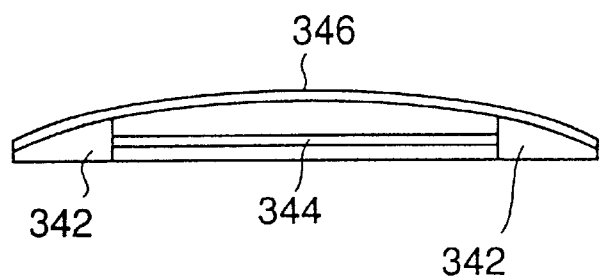
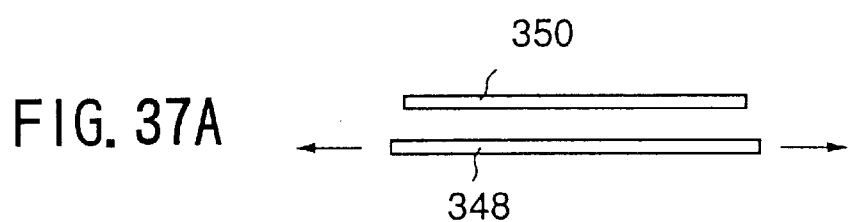
FIG. 37A
FIG. 37B
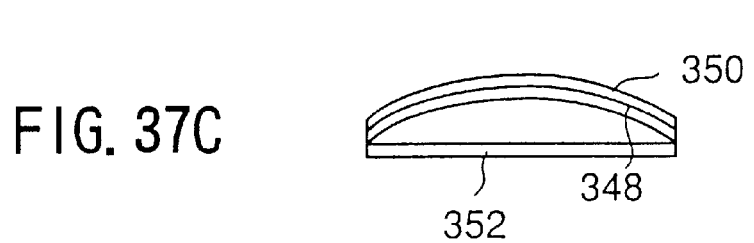
FIG. 37C

COORDINATE-DETECTING DEVICE AND COORDINATE INPUT PAD FOR USE IN COORDINATE-DETECTING DEVICE

BACKGROUND OF THE INVENTION

1. Field of the Invention

The present invention generally relates to a coordinate-detecting device used as input means for personal computers and word processors and a coordinate input pad thereof, and particularly relates to a coordinate-detecting device of a voltage-detecting type which generates coordinate data based on voltage values detected when there is a touch on a coordinate input panel having an x-coordinate and a Y-coordinate, and the coordinate input pad thereof.

2. Description of the Related Art

Recently, information-processing devices such as personal computers and word processors are provided with improved operation systems and other improved characteristics so as to be easily manipulated by the users. Also, for such information processing devices, coordinate-detecting devices are commonly used as pointing devices rather than mouses. This is because the coordinate-detecting devices are simple to use.

The coordinate-detecting device may be of an electromagnetic induction type, a capacitive coupling type or a resistive film type. Among those types of devices, the resistive film type is often used because of its various advantages such as a simple structure, a reduced cost and a reduced thickness.

In the following, a coordinate-detecting device of the prior art will be described with reference to FIG. 3.

FIG. 3 shows a coordinate-detecting device of the prior art including a coordinate input pad 201 and a detecting part 202. The coordinate input pad 201 serves as an operating surface via which a user can input information into an information-processing device such as a personal computer or a word processor. The detecting part 202 applies a voltage to the coordinate input pad 201 and then detects a position of a contact point on the coordinate input pad 201. Thus, the coordinate-detecting device outputs switching data and coordinate data when there is a touch on the coordinate input pad 201.

FIG. 1A is a perspective diagram showing a coordinate input pad used in the coordinate-detecting device of the related art. The coordinate input pad has two resistive films 203, 204 opposing each other with a plurality of dot spacers 216 placed between the resistivefilms 203, 204. The resistive films 203, 204 are provided with pairs of electrodes 205, 206 and 207, 208, respectively, which are formed along the edges and located at opposite sides of central input regions 215.

The resistivefilms 203, 204 are located such that the pair of electrodes 205, 206 and the pair of electrodes 207, 208 formed on the respective resistive films are perpendicular to each other. For example, as shown in FIG. 3, the electrode 205 parallel to the x-axis may be used for detecting a voltage corresponding to a y-coordinate. Also, the electrode 207 parallel to the y-axis may be used for detecting a voltage corresponding to an x-coordinate. It is to be noted that the plurality of dot spacers 216 made of an insulating material is provided in order to prevent any short-circuit between the two resistive films 203, 204 during a normal state.

The detecting part 202 includes a pair of transistors 209, 210 for applying a voltage across the pair of electrodes 205, 206 on the resistive film 203 and a pair of transistors 211, 212 for applying a voltage across the pair of electrodes 207, 208 on the resistive film 204. The detecting part 202 applies voltages to the resistive films 203, 204 by alternately turning on the pair of transistors 209, 210 and the pair of transistors 211, 212.

Further, the detecting part 202 includes a control part 213 for controlling the transistors 209, 210, 211, 212 and a voltage-detecting part 214 for detecting a voltage corresponding to a pressed-down point on the coordinate input pad 201. Thus, the detecting part 202 detects a coordinate of the pressed-down point on the coordinate input pad 201.

With the coordinate-detecting device of the above structure, when a point on the coordinate input pad 201 is pressed down, the two resistive films 203, 204 will be in contact at the pressed-down point. If a voltage has been applied across the electrodes 205, 206, the voltage will be divided at the contact point and a voltage representing the y-coordinate will be output via the electrode 207. Also, if a voltage has been applied across the electrodes 207, 208, the voltage will be divided at the contact point and a voltage representing the x-coordinate will be output via the electrode 205.

After detecting the voltages representing the x-coordinate and the y-coordinate, the voltage-detecting part 214 sends the voltages to the control part 213. At the control part 213, coordinate data or switching data of the contact point will be generated based on the voltages. Finally, the generated data is output from the control part 213.

The coordinate-detecting device of the prior art is advantageous in that, when the resistive films 203, 204 are flexed due to a factor such as a thermal stress, the opposing resistive films 203, 204 are prevented from coming into contact by means of the dot spacers 216 provided at appropriate intervals. Therefore, the resistive films 203, 204 will be in contact only when there is a touch on the coordinate input pad 201.

FIGS. 2A and 2B are cross-sectional diagrams showing problematic aspects of the coordinate input pad of the related art. As shown in FIG. 2A, the coordinate-detecting device of the prior art is provided with dot spacers made of an insulating material between opposing resistive films. Therefore, when there is a touch on the coordinate input pad at a point directly or substantially above a particular dot spacer, the resistive films will be in contact at locations surrounding the dot spacer (see FIG. 2B). Thus, detected data may be unstable.

In order to avoid such a problem and thus improve operability, it is necessary to increase intervals between the dot spacers while reducing the size and height of the dot spacers.

However, when the configuration of the dot spacers is altered as described above, there is a greater possibility that the resistive films are short-circuited since a gap between the resistive films may be narrowed due to a distortion or bowing of the resistive films.

Also, with the coordinate-detecting device of the prior art, the resistive films are joined by means of an adhesive layer of an order of several tens of micrometers. With this structure, there may be joint gaps at the joining part because of a level difference due to patterns provided at the joining part or because of the roughness of the surface of a resist layer. With such joint gaps, when the coordinate input pad is pressed over a comparatively large area, some of the air existing between the resistive films will escape via the joint gaps. Once the air has escaped, not enough air will immediately flow back to the space between the resistive films even if the pressure on the coordinate input pad is released. Therefore, the coordinate-detecting device of the prior art has a disadvantage that the resistive films may remain in contact for a considerable time.

SUMMARY OF THE INVENTION

Accordingly, it is a general object of the present invention to provide a coordinate-detecting device and a coordinate input pad used in the coordinate-detecting device which can solve the above problems.

It is another and more specific object of the present invention to provide a coordinate-detecting device which can detect accurate coordinate data at any point on an operating surface of a coordinate input pad.

In order to achieve the above objects according to the present invention, a coordinate-detecting device of a voltage-detecting type includes a coordinate input pad having an upper sheet and a lower sheet opposing each other at a predetermined gap by a repulsive force between magnetic poles with the same polarity.

The coordinate-detecting device described above does not include dot spacers. Therefore, the resistive films may be in contact at any locations on the operating surface, whereas in the related art, the resistive films may be in contact at location surrounding a dot spacer and thus detected data may be unstable.

It is still another object of the present invention to provide a coordinate-detecting device which can withstand a deformation such as a distortion due to deterioration with age of the upper sheet.

In order to achieve the above object according to the present invention, the upper sheet and the lower sheet oppose each other at a predetermined gap by a tension in the upper sheet.

Also, in order to achieve the above object according to the present invention, the upper sheet and the lower sheet oppose each other at a predetermined gap by a central part of the upper sheet being bent upwards.

Further, in order to achieve the above object according to the present invention, the upper sheet and the lower sheet oppose each other at a predetermined gap by a central part of the lower sheet being bent downwards.

With any one of the coordinate-detecting devices described above, it is possible to prevent problems related to an unintended short circuit.

It is yet another object of the present invention to provide a coordinate-detecting device which can prevent the upper and lower sheets from remaining in contact for a considerable time.

In order to achieve the above object according to the present invention, a cavity is formed between the upper sheet and the lower sheet opposing each other at a predetermined gap, and the lower sheet is provided on a mounting board, communicating holes being provided through the lower sheet and the mounting board for establishing a communication between the cavity and external air, the communication being established depending on a state of pressure on the coordinate input pad.

Also, in order to achieve the above object according to the present invention, the upper sheet and the lower sheet oppose each other at a predetermined gap by the upper and lower sheets being joined together via a frame-like adhesive film of a thick-film type, a sealed cavity being formed between the upper and lower sheets.

With either one of the coordinate-detecting devices described above, it is possible to obtain accurate coordinate data.

In the present invention, coordinate input pads used in the above-described coordinate-detecting devices are also disclosed.

Other objects and further features of the present invention will be apparent from the following detailed description when read in conjunction with the accompanying drawings.

BRIEF DESCRIPTION OF THE DRAWINGS

FIG. 36 is a cross-sectional diagram showing an eighteenth embodiment of the coordinate input pad of the present invention.

FIGS. 37A to 37C are cross-sectional diagrams showing a nineteenth embodiment of the coordinate input pad of the present invention.

DETAILED DESCRIPTION OF THE PREFERRED EMBODIMENTS

In the following, principles and embodiments of the present invention will be described with reference to the accompanying drawings.

Figure 30:
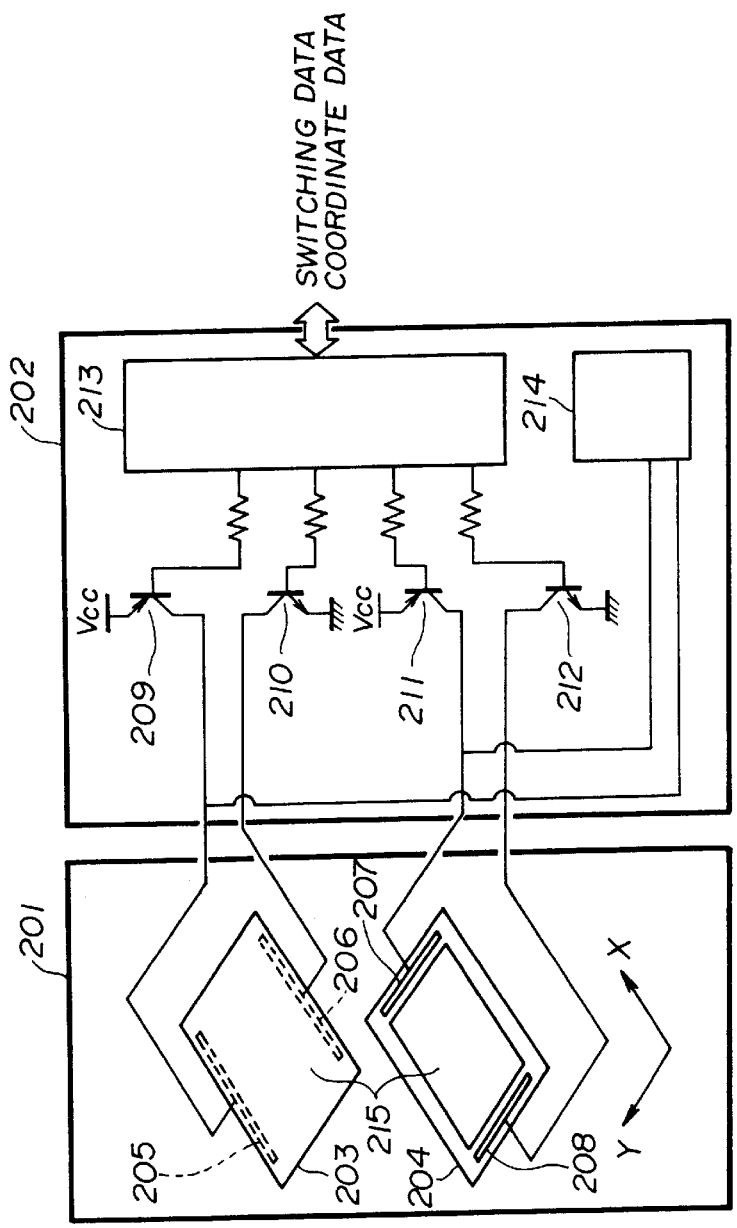
FIG. 30 is a diagram showing a general structure of a coordinate-detecting device of the present invention.

FIG. 30 shows a coordinate-detecting device of the present invention including a coordinate input pad 201 and a detecting part 202. The coordinate input pad 201 serves as an operating surface via which a user can input information into an information-processing device such as a personal computer or a word processor. The detecting part 202 applies a voltage to the coordinate input pad 201 and then detects a position of a contact point on the coordinate input pad 201. Thus, the coordinate-detecting device outputs switching data and coordinate data when there is a touch on the coordinate input pad 201.

The coordinate input pad 201 has two resistive films 203, 204 opposing each other at a predetermined gap by a repulsive force between magnetic poles with the same polarity. The resistive films 203, 204 are provided with pairs of electrodes 205, 206 and 207, 208, respectively, which are formed along the edges and located at opposite sides of central input regions 215.

The resistive films 203, 204 are located such that the pair of electrodes 205, 206 and the pair of electrodes 207, 208 formed on the respective resistive films are perpendicular to each other. For example, as shown in FIG. 30, the electrode 205 parallel to the x-axis may be used for detecting a voltage corresponding to a y-coordinate. Also, the electrode 207 parallel to the y-axis may be used for detecting a voltage corresponding to an x-coordinate.

The detecting part 202 includes a pair of transistors 209, 210 for applying a voltage across the pair of electrodes 205, 206 on the resistive film 203 and a pair of transistors 211, 212 for applying a voltage across the pair of electrodes 207, 208 on the resistive film 204. The detecting part 202 applies voltages to the resistive films 203, 204 by alternately turning on the pair of transistors 209, 210 and the pair of transistors 211, 212.

Further, the detecting part 202 includes a control part 213 for controlling the transistors 209, 210, 211, 212 and a voltage-detecting part 214 for detecting a voltage corresponding to a pressed-down point on the coordinate input pad 201. Thus, the detecting part 202 detects a coordinate of the pressed-down point on the coordinate input pad 201.

With the coordinate-detecting device of the above structure, when a point on the coordinate input pad 201 is pressed down, the two resistive films 203, 204 will be in contact at the pressed-down point. If a voltage has been applied across the electrodes 205, 206, the voltage will be divided at the contact point and a voltage representing the y-coordinate will be output via the electrode 207. Also, if a voltage has been applied across the electrodes 207, 208, the voltage will be divided at the contact point and a voltage representing the x-coordinate will be output via the electrode 205.

After detecting the voltages representing the x-coordinate and the y-coordinate, the voltage-detecting part 214 sends the voltages to the control part 213. At the control part 213, coordinate data or switching data of the contact point will be generated based on the voltages. Finally, the generated data is output from the control part 213.

The coordinate-detecting device of the present invention is advantageous in that, when the resistive films 202, 204 are flexed due to a factor such as a thermal stress, the opposing resistive films 203, 204 will not come into contact by a repulsive force between the magnetic poles with the same polarity. Therefore, the resistive films 203, 204 will be in contact only when there is a touch on the coordinate input pad 201.

Figure 4A:
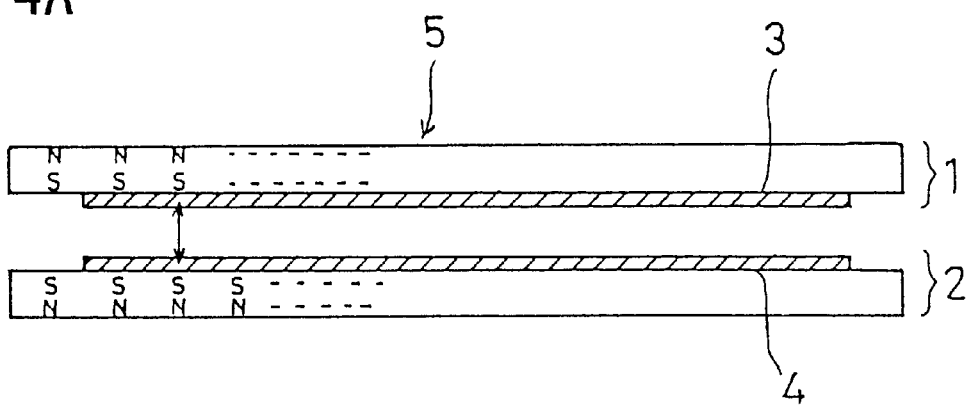
FIGS. 4A and 4B are cross-sectional diagrams showing a basic structure of a coordinate input pad of the present invention.
Figure 4B:
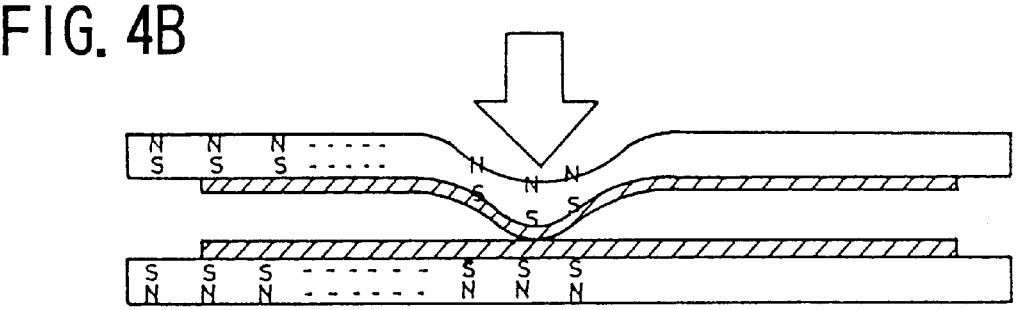

FIGS. 4A and 4B are cross-sectional diagrams showing a basic structure of a coordinate input pad of the present invention. The coordinate input pad includes an upper sheet 1 and a lower sheet 2 provided with resistive films 3 and 4, respectively. There are no dot spacers provided in the coordinate input pad of the present invention. As shown in FIG. 4A, in a normal state, the upper sheet 1 and the lower sheet 2 oppose each other at a predetermined gap by a repulsive force between magnetic poles with the same polarity. Only when an operating surface 5 of the coordinate pad is pressed by the user, as shown in FIG. 4B, will the resistive films 3, 4 provided on the upper and lower sheets 1, 2 be in contact. Then, when the pressure is released, the upper sheet 1 and the lower sheet 2 will be again held at the predetermined gap by the repulsive force between the magnetic poles with the same polarity. In FIGS. 4A and 4B, the upper sheet 1 and the lower sheet 2 are held at a predetermined gap by means of the repulsive force between S-poles, however a similar effect may be obtained with a repulsive force between N-poles.

Figure 1A:
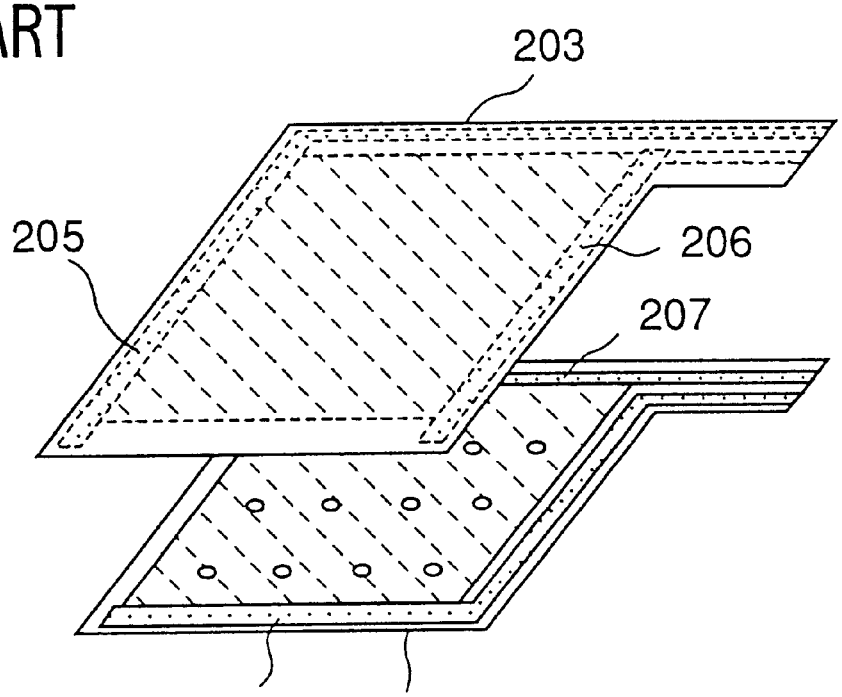
FIG. 1A is a perspective diagram showing a coordinate input pad used in a coordinate-detecting device of the related art.
Figure 1B:
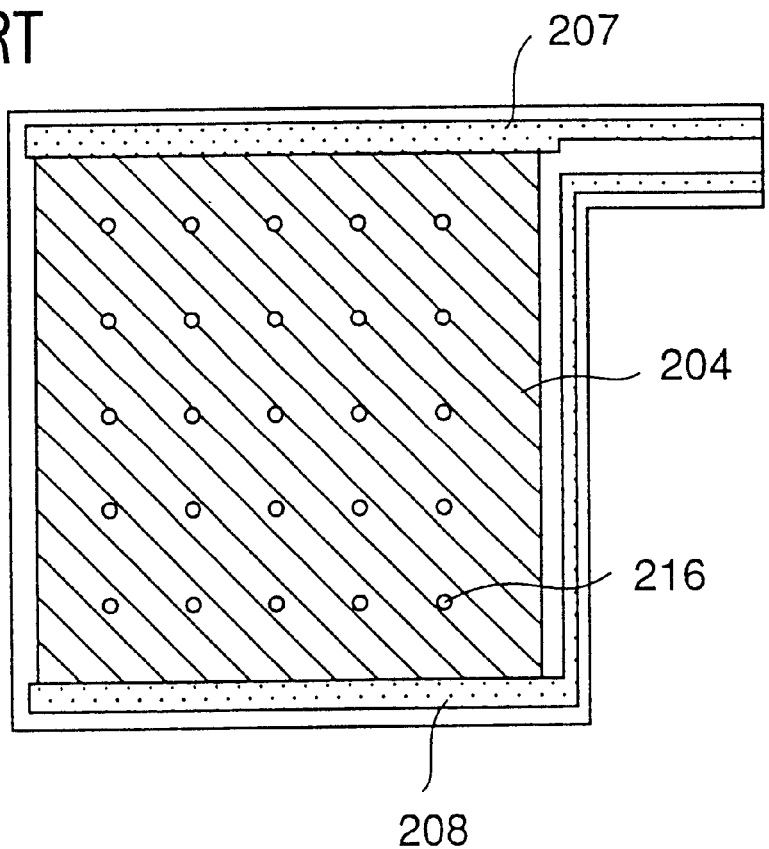
FIG. 1B is a plan view of one of the resistive films used in the coordinate input pad used in the coordinate-detecting device of the related art.
Figure 2A:
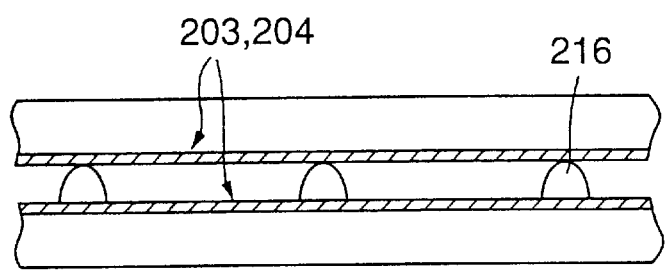
FIGS. 2A and 2B are cross-sectional diagrams showing problematic aspects of the coordinate input pad of the related art.
Figure 2B:
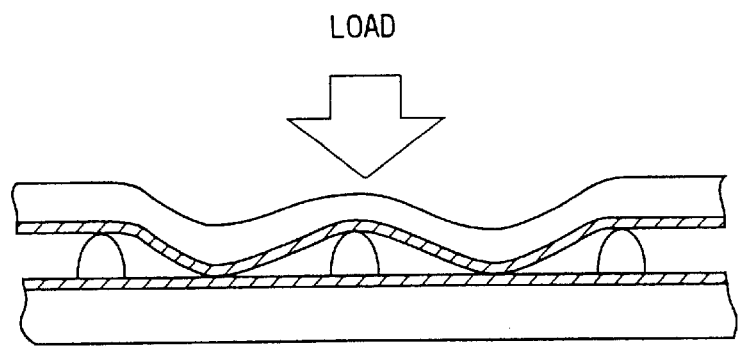
Figure 3:
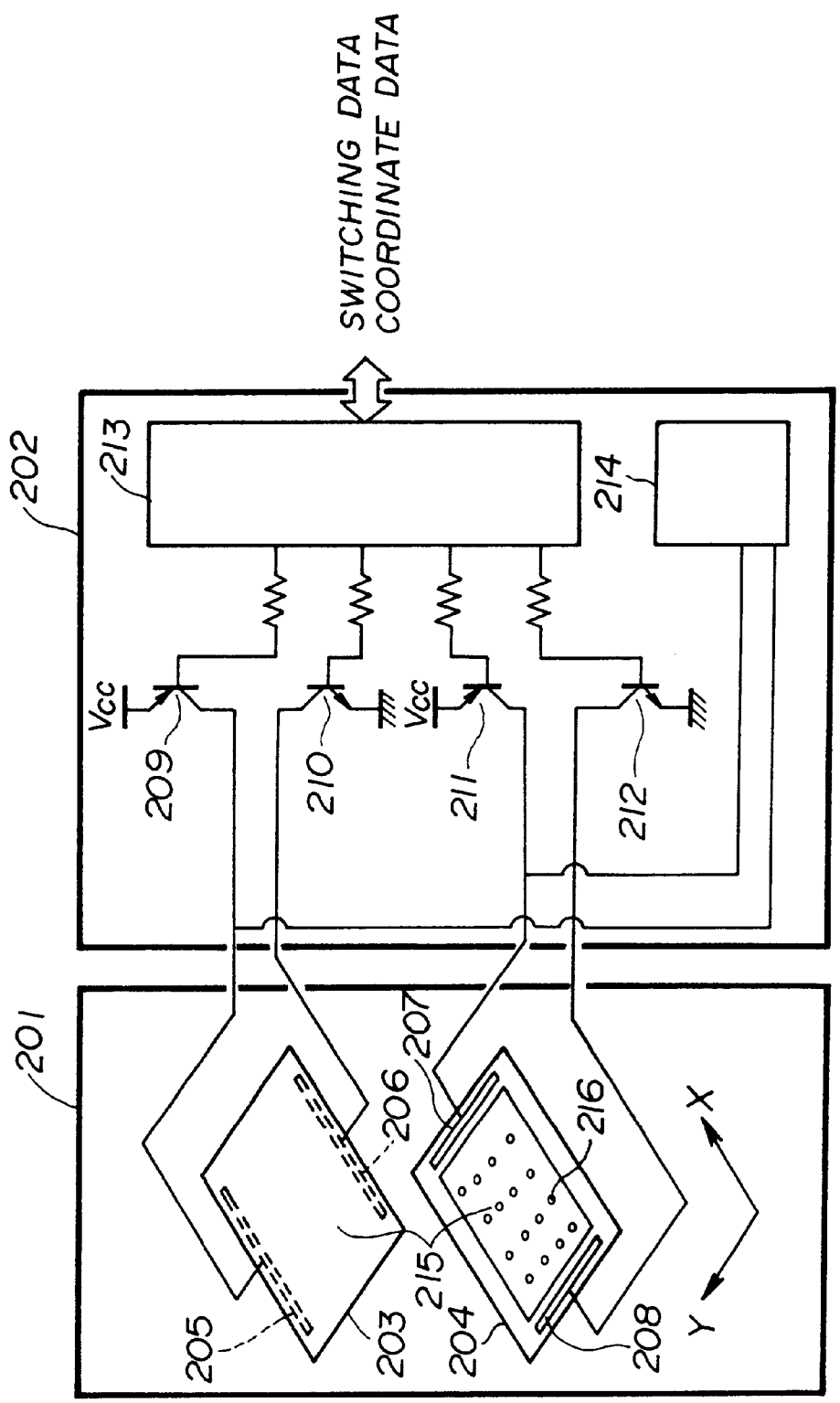
FIG. 3 is a diagram showing a general structure of a coordinate-detecting device of the related art.

Therefore, with the coordinate-detecting device of the present invention, it is possible to avoid the problem shown in FIG. 2B, in which problem detected data becomes unstable when there is a touch on the coordinate input pad at a point directly or substantially above a dot spacer, due to the resistive films being in contact at locations surrounding the dot spacer. Therefore, accurate coordinate data can be detected at any point on the operating surface 5.

Figure 5:
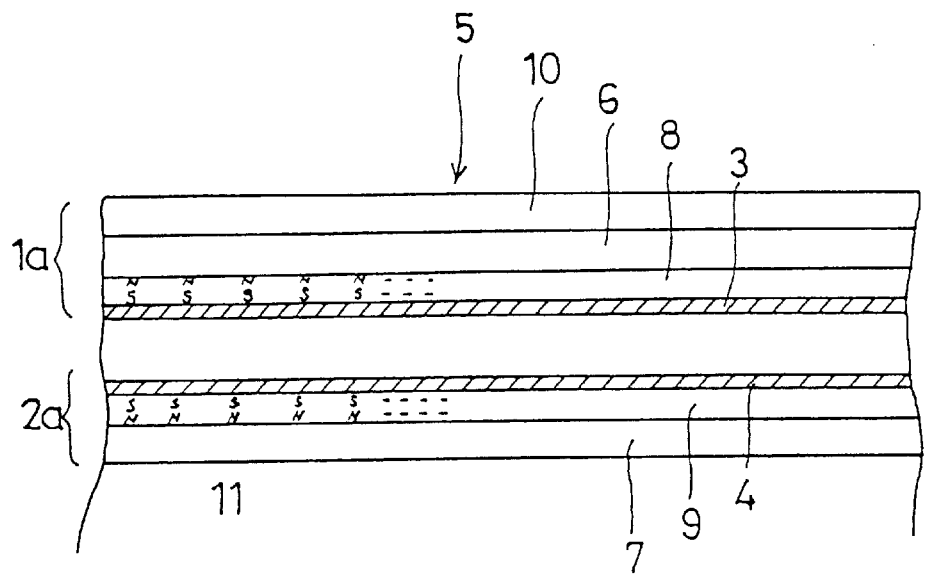
FIG. 5 is a cross-sectional diagram showing a first embodiment of the coordinate input pad of the present invention.

FIG. 5 is a cross-sectional diagram showing a first embodiment of the coordinate input pad of the present invention. An upper sheet 1a includes a resin film 6 used as a base material. The resin film 6 is provided with a magnetic printed layer 8, the resistive layer 3 and electrode patterns and wiring patterns (not shown) laminated thereon. The resin film 6 may be made of a material such as PET, PC or polyimide. The magnetic printed layer 8 is provided by uniformly screen printing paste dispersed with a hard magnetic material. Similarly, a lower sheet 2a includes a resin film 7 used as a base material. The resin film 7 is provided with a magnetic printed layer 9, the resistive layer 4 and electrode patterns and wiring patterns (not shown) laminated thereon. The resin film 7 may be made of a material such as PET, PC or polyimide. The magnetic printed layer 9 is provided by uniformly screen printing paste dispersed with a hard magnetic material.

Further, the above-described laminated structures including the upper sheet 1a and the lower sheet 2a are resist coated. The magnetic printed layers 8, 9 are magnetized in such a manner that the surfaces provided with the resistive films 3 and 4 have the same polarity of either N-poles or S-poles. Then, the upper sheet 1a is placed over the lower sheet 2a with their surfaces having the same polarity opposing each other. The upper and lower sheets 1a and 2a are joined at the periphery and then mounted on a mounting board 11. In order to protect the upper sheet 1a and to improve the sense of touch of the operating surface 5, a protective sheet 10 is provided on the operating surface 5 of the upper sheet 1a.

With the coordinate input pad shown in FIG. 5, the upper and lower sheets 1a and 2a will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 6:
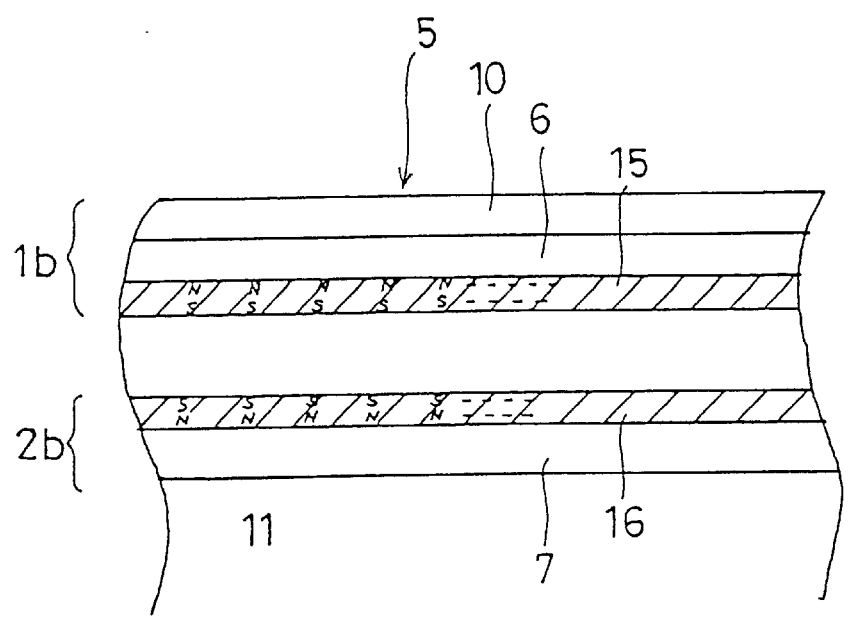
FIG. 6 is a cross-sectional diagram showing a second embodiment of the coordinate input pad of the present invention.

FIG. 6 is a cross-sectional diagram showing a second embodiment of the coordinate input pad of the present invention. An upper sheet 1b includes a resin film 6 used as a base material. The resin film 6 is provided with a resistive film with magnetic particles 15 and electrode patterns and wiring patterns (not shown) laminated thereon. The resin film 6 may be made of a material such as PET, PC or polyimide. The resistive film with magnetic particles 15 is provided by uniformly printing resistive film-print paste dispersed with a hard magnetic material. Similarly, a lower sheet 2b includes a resin film 7 used as a base material. The resin film 7 is provided with a resistive film with magnetic particles 16 and electrode patterns and wiring patterns (not shown) laminated thereon. The resin film 7 may be made of a material such as PET, PC or polyimide. The resistive film with magnetic particles 16 is provided by uniformly printing resistive film-print paste dispersed with a hard magnetic material.

Further, the above-described laminated structures including the upper sheet 1b and the lower sheet 2b are resist coated. The resistive films with magnetic particles 15, 16 are magnetized in such a manner that the opposing surfaces of to the upper and lower sheets 1b, 2b, respectively, will have the same polarity of either N-poles or S-poles. Then, the upper sheet 1b is placed over the lower sheet 2b so that with their surfaces having the same polarity oppose each other. The upper and lower sheets 1b and 2b are joined at the periphery and then mounted on a mounting board 11. In order to protect the upper sheet 1a and to improve the sense of touch of the operating surface 5, a protective sheet 10 is provided on the operating surface 5 of the upper sheet 1a.

With the coordinate input pad shown in FIG. 6, the upper and lower sheets 1b and 2b will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 7:
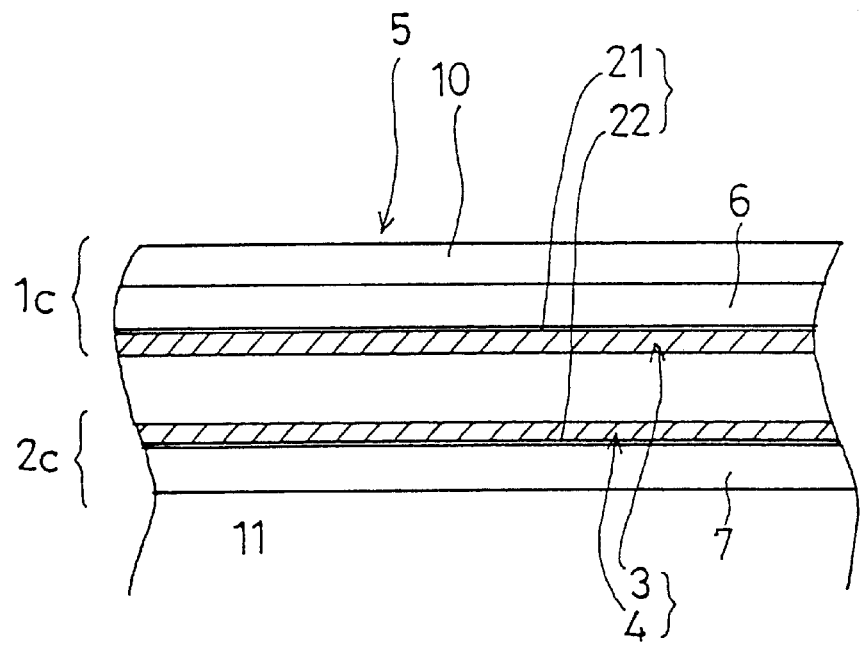
FIG. 7 is a cross-sectional diagram showing a third embodiment of the coordinate input pad of the present invention.

FIG. 7 is a cross-sectional diagram showing a third embodiment of the coordinate input pad of the present invention. An upper sheet 1c includes a resin film 6 used as a base material. The resin film 6 is provided with a hard magnetic thin film 21, the resistive layer 3 and electrode patterns and wiring patterns (not shown) laminated thereon. The resin film 6 may be made of a material such as PET, PC or polyimide. The hard magnetic thin film 21 is formed by vapor deposition or sputtering in a magnetic field. Similarly, a lower sheet 2c includes a resin film 7 used as a base material. The resin film 7 is provided with a hard magnetic thin film 22, the resistive layer 4 and electrode patterns and wiring patterns (not shown) laminated thereon. The resin film 7 may be made of a material such as PET, PC or polyimide. The hard magnetic thin film 22 is formed by vapor deposition or sputtering in a magnetic field.

Further, the above-described laminated structures including the upper sheet 1c and the lower sheet 2c are resist coated. The hard magnetic thin films 21, 22 are magnetized in such a manner that the surfaces provided with the resistive films 3, 4 have the same polarity of either N-poles or S-poles. Then, the upper sheet 1c is placed over the lower sheet 2c with their surfaces having the same polarity opposing each other. The upper and lower sheets 1c and 2c are joined at the periphery and then mounted on a mounting board 11. In order to protect the upper sheet 1a and to improve the sense of touch of the operating surface 5, a protective sheet 10 is provided on the operating surface 5 of the upper sheet 1c.

With the coordinate input pad shown in FIG. 7, the upper and lower sheets 1c and 2c will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 8:
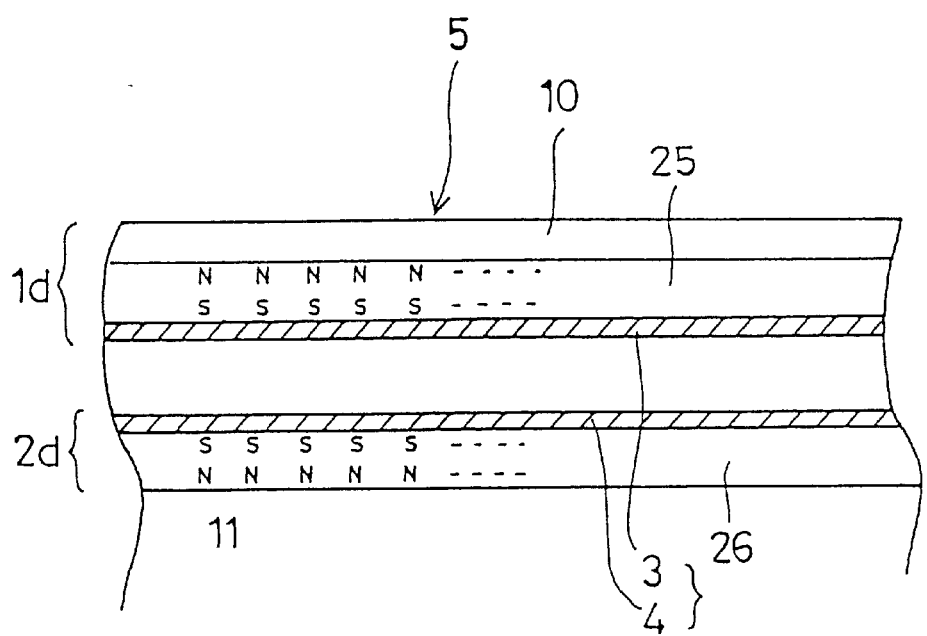
FIG. 8 is a cross-sectional diagram showing a fourth embodiment of the coordinate input pad of the present invention.

FIG. 8 is a cross-sectional diagram showing a fourth embodiment of the coordinate input pad of the present invention. An upper sheet 1d includes a film with magnetic particles 25 used as a base material. The base film with magnetic particles 25 is provided with the resistive layer 3 and electrode patterns and wiring patterns (not shown) laminated thereon. The base film with magnetic particles 25 may be made of a film in which particles of a hard magnetic material are mixed. Similarly, a lower sheet 2d includes a film with magnetic particles 26 used as a base material. The base film with magnetic particles 26 is provided with the resistive layer 4 and electrode patterns and wiring patterns (not shown) laminated thereon. The base film with magnetic particles 26 may be made of a film in which particles of a hard magnetic material are mixed.

Further, the above-described laminated structures including the upper sheet 1d and the lower sheet 2d are resist coated. The base films with magnetic particles are magnetized in such a manner that the surfaces provided with the resistive films 3, 4 have the same polarity of either N-poles or S-poles. Then, the upper sheet 1d is placed over the lower sheet 2a with their surfaces having the same polarity opposing each other. The upper and lower sheets 1d and 2d are joined at the periphery and then mounted on a mounting board 11. In order to protect the upper sheet 1d and to improve the sense of touch of the operating surface 5, a protective sheet 10 is provided on the operating surface 5 of the upper sheet 1d.

With the coordinate input pad shown in FIG. 8, the upper and lower sheets 1d and 2d will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 9:
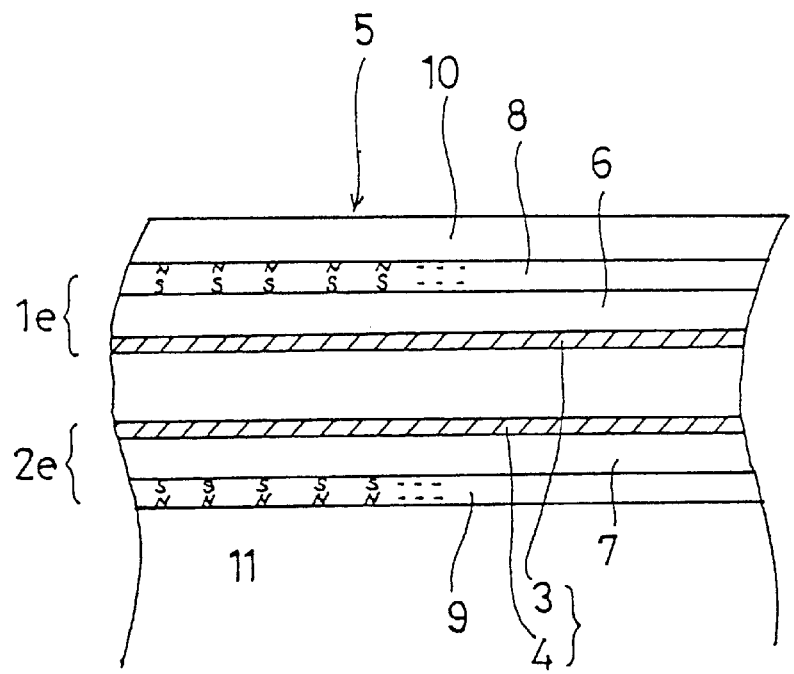
FIG. 9 is a cross-sectional diagram showing a fifth embodiment of the coordinate input pad of the present invention.

FIG. 9 is a cross-sectional diagram showing a fifth embodiment of the coordinate input pad of the present invention. An upper sheet 1e includes a resin film 6 used as a base material. The resin film 6 is provided with a magnetic printed layer 8 on one of the surfaces and the resistive layer 3 and electrode patterns and wiring patterns (not shown) laminated on the other surface of the resin film 6. The resin film 6 may be made of a material such as PET, PC or polyimide. The magnetic printed layer 8 is provided by uniformly screen printing paste dispersed with a hard magnetic material.

The lower sheet includes a magnetic printed layer 9 provided on a printed board 11, and further laminated with a resin film 7, a resistive film 4, electrode patterns and wiring patterns (not shown). The resin film 7 may be made of a material such as PET, PC or polyimide. The magnetic printed layer 9 is provided by uniformly screen printing paste dispersed with a hard magnetic material.

Further, the above-described laminated structures including the upper sheet 1e and the lower sheet 2e are resist coated. The magnetic printed layers 8, 9 are magnetized in such a manner that the surfaces closer to the resistive films 3, 4 have the same polarity of either N-poles or S-poles. Then, the upper sheet 1e is placed over the lower sheet 2e with their surfaces having the same polarity opposing each other. The upper and lower sheets 1e and 2e are joined at the periphery and then mounted on a mounting board 11. In order to protect the upper sheet 1e and to improve the sense of touch of the operating surface 5, a protective sheet 10 is provided on the operating surface 5 of the upper sheet 1e.

With the coordinate input pad shown in FIG. 9, the upper and lower sheets 1e and 2e will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 10:
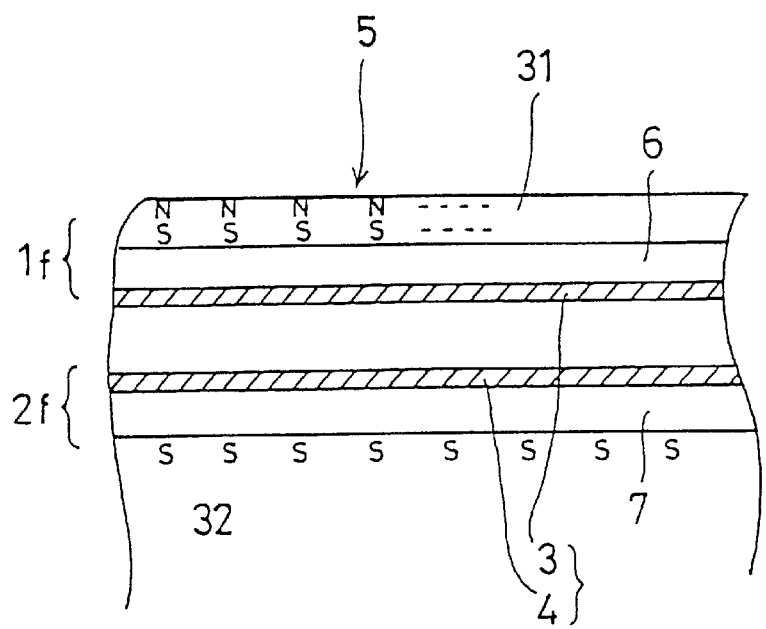
FIG. 10 is a cross-sectional diagram showing a sixth embodiment of the coordinate input pad of the present invention.

FIG. 10 is a cross-sectional diagram showing a sixth embodiment of the coordinate input pad of the present invention. An upper sheet 1f includes a resin film 6 used as a base material. The resin film 6 is provided with a film with magnetic particles 31, on one of the surfaces of the resin film 6, and further provided with the resistive layer 3 and electrode patterns and wiring patterns (not shown) laminated on the other surface of the resin film 6. The film with magnetic particles 31 may be made of a film in which particles of a hard magnetic material are mixed. A lower sheet 2f includes a resin film 7 used as a base material. The resin film 7 is formed on a mounting board 32 and is provided with the resistive layer 4 and electrode patterns and wiring patterns (not shown) laminated on the surface opposite the mounting board 32. The resin film 7 may be made of a material such as PET, PC or polyimide. The mounting board 32 is made of a compound magnet made of a material such as rubber and plastics mixed with hard magnetic particles.

Further, the upper sheet 1f and the mounting board 32 are magnetized in such a manner that the surfaces provided with the resistive films 3, 4 have the same polarity of either N-poles or S-poles. Then, the upper sheet 1f is placed over the lower sheet 2f with their surfaces having the same polarity opposing each other. The upper and lower sheets 1f and 2f are joined at the periphery. In the present embodiment, the film with magnetic particles 31 is used as a protective film for protecting the upper sheet 1f and for improving the sense of touch of the operating surface 5.

With the coordinate input pad shown in FIG. 10, the upper and lower sheets 1f and 2f will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

According to the first to sixth embodiments of the present invention, the upper and lower sheets oppose each other at a predetermined gap by a repulsive force between magnetic poles with the same polarity (i.e., S-pole and S-pole, N-pole and N-pole), as shown in FIG. 4A. Only when an operating surface of the coordinate pad is pressed by the user, as shown in FIG. 4B, will the resistive films provided on the upper and lower sheets be in contact. Then, when the pressure is released, the upper sheet and the lower sheet will be again held at the predetermined gap by a repulsive force between the magnetic poles with the same polarity.

However, with the coordinate-detecting device based on the principle shown in FIGS. 4A and 4B (i.e., first to sixth embodiments), the polarized area of each sheet is considerably large and therefore becomes a film-like magnet with a very small thickness. As a result, at a location near the center of the film-like magnet with the large area, the magnetic field strength may not be strong enough for providing an effective repulsive force.

Figure 15:
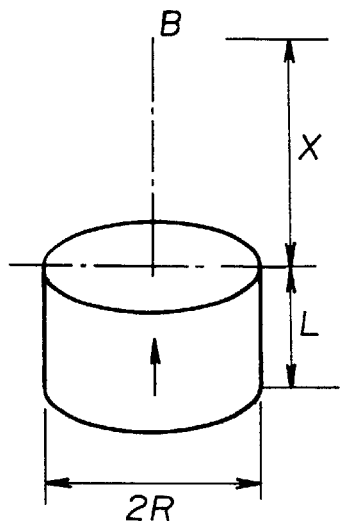
FIG. 15 is a perspective diagram showing a cylindrical magnet.

Referring to FIG. 15, a magnetic field strength along the central axis of a cylindrical magnet will be described. The magnetic field strength or a magnetic flux density B can be approximated by an expression:

$$B = (Br/2) \times \left[ \frac{L+X}{\sqrt{R^2 + (L+X)^2}} - \frac{X}{\sqrt{R^2 + X^2}} \right]$$

It can be seen from the above equation that the magnetic field strength will become smaller as a radius R is increased and a thickness L is decreased. Similarly, with regard to a columnar magnet with a rectangular cross-section, a magnet with a small thickness and a large magnetized area has a smaller magnetic field strength.

Figure 11:
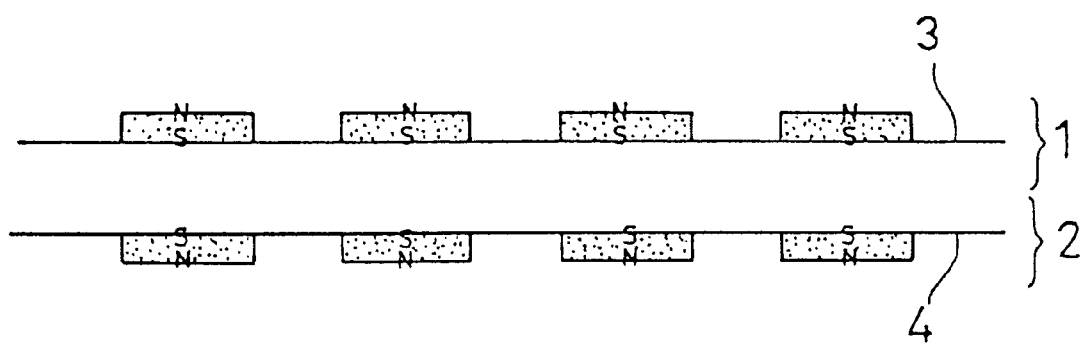
FIG. 11 is a cross-sectional diagram showing one basic structure of the coordinate input pad of the present invention, particularly its upper and lower resistive films.
Figure 12:
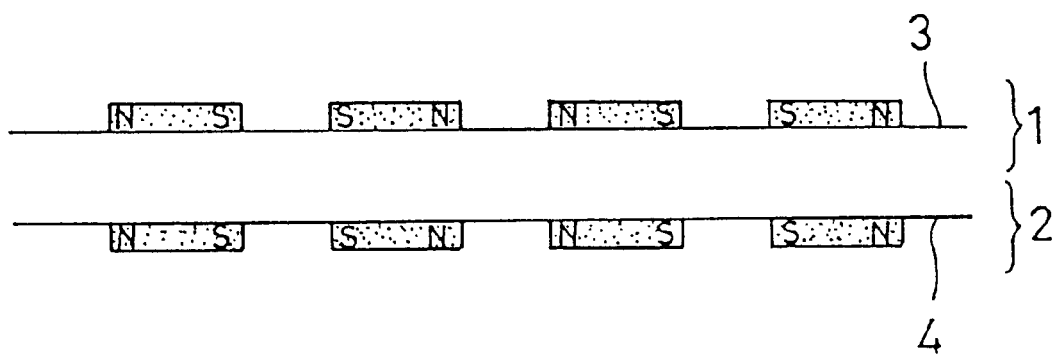
FIG. 12 is a cross-sectional diagram showing another basic structure of the coordinate input pad of the present invention, particularly its upper and lower resistive films.

Accordingly, as shown in FIGS. 11 and 12, the upper sheet 1 and the lower sheet 2 are provided with film magnet patterns distributed symmetrically on each sheet. The film magnets are magnetized such that opposing surfaces have the same polarity. FIG. 11 shows an embodiment in which the film magnets are magnetized in a direction of the thickness of the film magnets. FIG. 12 shows an embodiment in which the film magnets are magnetized in a lateral direction of the film magnets. In other words, a film magnet is not provided as a single large film magnet as shown in FIGS. 4A and 4B, but as a pattern of a plurality of film magnets as shown in FIGS. 11 and 12. Accordingly, the coordinate-detecting device will be provided with a greater magnetic field strength as compared to the film magnets shown in FIGS. 4A and 4B. Also, in FIG. 11, the resistive layers 3, 4 are held at a predetermined gap by a repulsive force between S-poles, however, the same effect can be obtained with a repulsive force between N-poles.

In the following, further embodiments of the coordinate input pad of the present invention using basic structures of the coordinate input pad shown in FIGS. 11 and 12 will be described.

Figure 13:
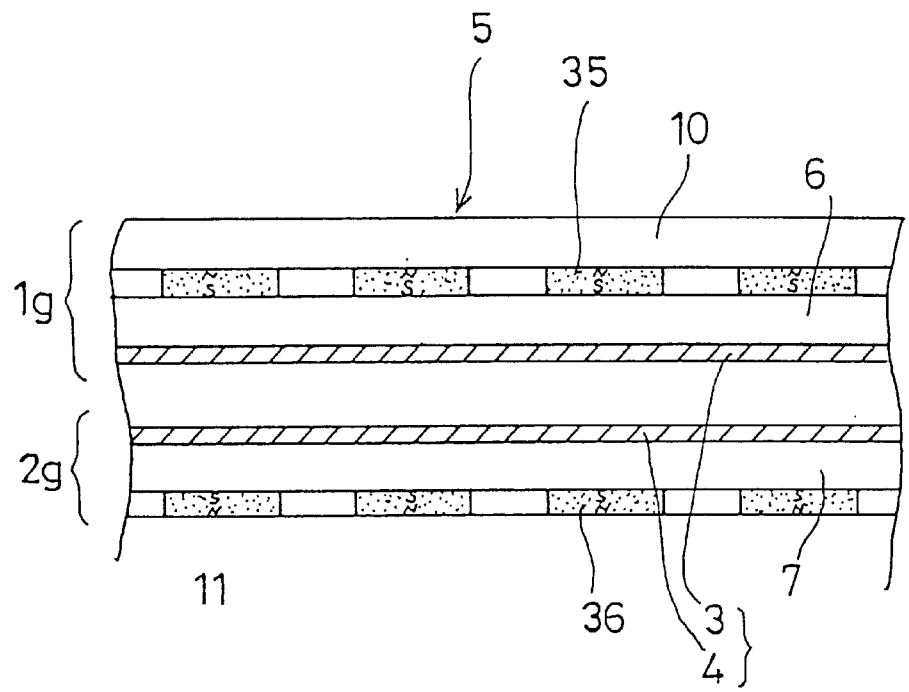
FIG. 13 is a cross-sectional diagram showing a seventh embodiment of the coordinate input pad of the present invention.

FIG. 13 is a cross-sectional diagram showing a seventh embodiment of the coordinate input pad of the present invention. An upper sheet 1g includes a resin film 6 used as a base material. The resin film 6 is provided with a plurality of printed film magnets provided on one of the surfaces of the resin film 6. The resistive layer 3 and electrode patterns and wiring patterns (not shown) are laminated either on the printed film magnets 35 or on the other surface of the resin film 6. (In FIG. 13, the latter case is shown for the sake of convenience of illustration.) The resin film 6 may be made of a material such as PET, PC or polyimide. A plurality of the printed-film magnets 35, in other words, film-like magnets, are printed at predetermined intervals. Similarly, a lower sheet 2g includes a resin film 7 used as a base material. The resin film 7 is provided with a plurality of printed film magnets 36 laminated on one of the surfaces. The resistive layer 4 and electrode patterns and wiring patterns (not shown) are laminated either on the plurality of printed film magnets 36 or on the other surface of the resin film 7. (In FIG. 13, the latter case is shown for the sake of convenience of illustration.) The resin film 7 may be made of a material such as PET, PC or polyimide. A plurality of the printed-film magnets 36, in other words, film-like magnets, are printed at predetermined intervals.

Further, the above-described laminated structures including the upper sheet 1g and the lower sheet 2g are resist coated. The printed film magnets 35, 36 are magnetized in such a manner that opposing surfaces will have the same polarity of either N-poles or S-poles. Then, the upper sheet 1g is placed over the lower sheet 2g with their surfaces having the same polarity opposing each other. The upper and lower sheets 1g and 2g are joined at the periphery and then mounted on a mounting board 11. In order to protect the upper sheet 1g and to improve the sense of touch of the operating surface 5, a protective sheet 10 is provided on the operating surface 5 of the upper sheet 1g.

With the coordinate input pad shown in FIG. 13, the upper and lower sheets 1g and 2g will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 14:
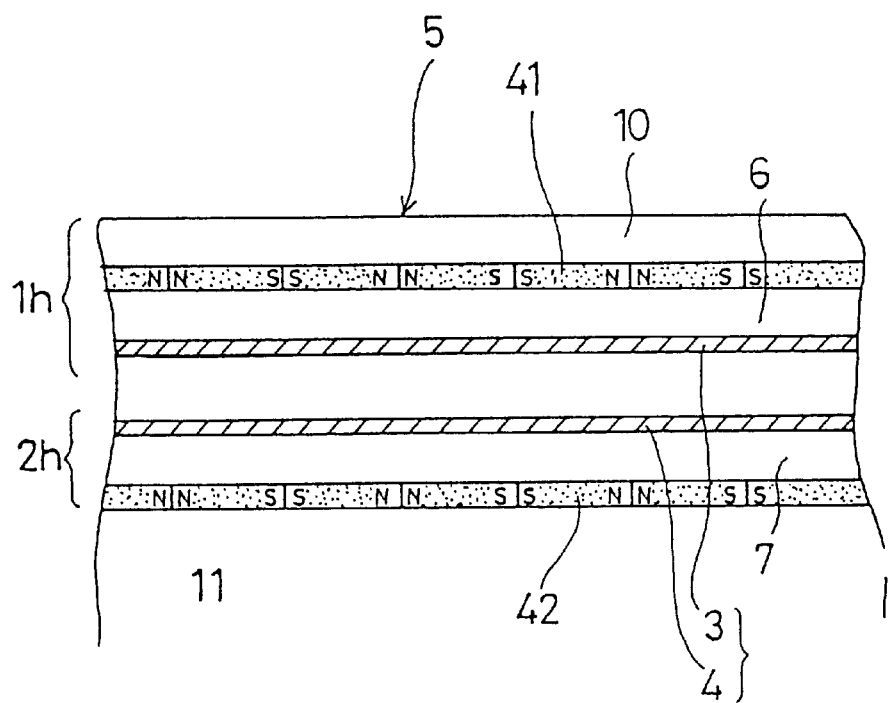
FIG. 14 is a cross-sectional diagram showing an eighth embodiment of the coordinate input pad of the present invention.

FIG. 14 is a cross-sectional diagram showing an eighth embodiment of the coordinate input pad of the present invention. An upper sheet 1h includes a resin film 6 used as a base material. The resin film 6 is provided with a plurality of printed film magnets 41 laminated on one of the surfaces of the resin film 6. The resistive layer 3 and electrode patterns and wiring patterns (not shown) are laminated either on the plurality of printed film magnets 41 or on the other surface of the resin film 6. (In FIG. 14, the latter case is shown for the sake of convenience of illustration.) The resin film 6 may be made of a material such as PET, PC or polyimide. A plurality of the printed film magnets 41, in other words, film-like magnets, are printed at predetermined intervals. Similarly, a lower sheet 2h includes a resin film 7 used as a base material. The resin film 7 is provided with a plurality of printed film magnets 42 laminated on one of the surfaces. The resistive layer 4 and electrode patterns and wiring patterns (not shown) are laminated either on the plurality of printed film magnets 42 or on the other surface of the resin film 7. (In FIG. 14, the latter case is shown for the sake of convenience of illustration.) The resin film 7 may be made of a material such as PET, PC or polyimide. A plurality of the printed film magnets 42, in other words, film-like magnets, are printed at predetermined intervals.

Further, the above-described laminated structures including the upper sheet 1h and the lower sheet 2h are resist coated. The printed film magnets 41, 42 are magnetized in a transverse direction in such a manner the opposing surfaces will have the same polarity of either N-poles or S-poles. Then, the upper sheet 1h is placed over the lower sheet 2h with their surfaces having the same polarity opposing each other. The upper and lower sheets 1h and 2h are joined at the periphery and then mounted on a mounting board 11. In order to protect the upper sheet 1h and to improve the sense of touch of the operating surface 5, a protective sheet 10 is provided on the operating surface 5 of the upper sheet 1h.

With the coordinate input pad shown in FIG. 14, the upper and lower sheets 1h and 2h will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

The seventh and eighth embodiments described above are provided with a pattern of a plurality of film magnets, so that a greater magnetic field strength can be obtained as compared to the film magnets each formed as a single large film magnet as shown in FIGS. 4A and 4B.

In the following, other embodiments for obtaining a greater magnetic field strength compared to the embodiments shown in FIGS. 4A and 4B will be described with reference to FIGS. 16 and 17.

Figure 16:
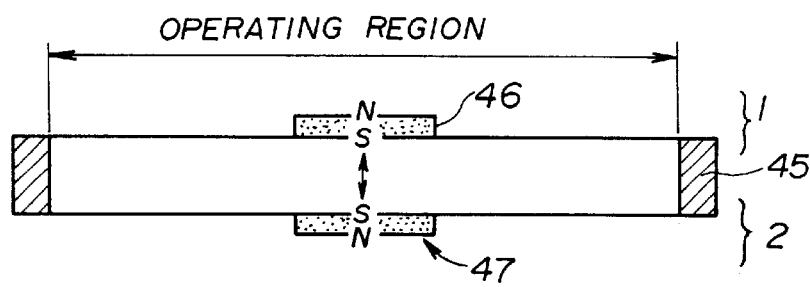
FIG. 16 is a cross-sectional diagram showing one basic structure of the coordinate input pad of the present invention, particularly its upper and lower resistive films.
Figure 17:
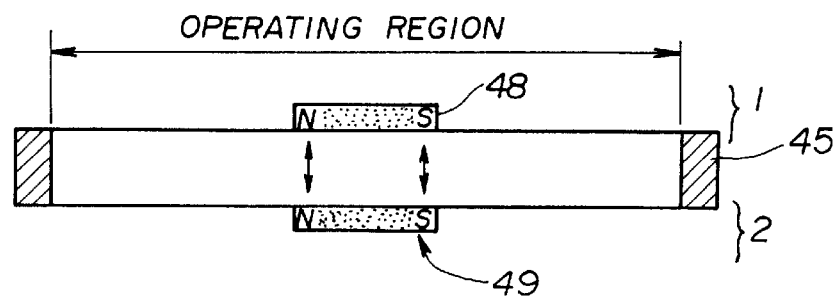
FIG. 17 is a cross-sectional diagram showing another basic structure of the coordinate input pad of the present invention, particularly its upper and lower resistive films.

FIGS. 16 and 17 are diagrams showing basic structures of the coordinate input pad of the present invention. The upper sheet 1 and the lower sheet 2 are each provided with a film magnet pattern at corresponding positions near the center of the operating regions. In FIG. 16, film magnets 46, 47 are magnetized in a thickness direction in such a manner that opposing surfaces have the same polarity. In FIG. 17, film magnets 48, 49 are magnetized in a transverse direction in such a manner that opposing surfaces have the same polarity. In FIG. 16, the upper sheet 1 and the lower sheet 2 are held at a predetermined gap by means of the repulsive force between S-poles, however a similar effect may be obtained with the repulsive force between N-poles.

In the following, further embodiments of the coordinate input pad of the present invention using basic structures of the coordinate input pad shown in FIGS. 16 and 17 will be described.

Figure 18A:
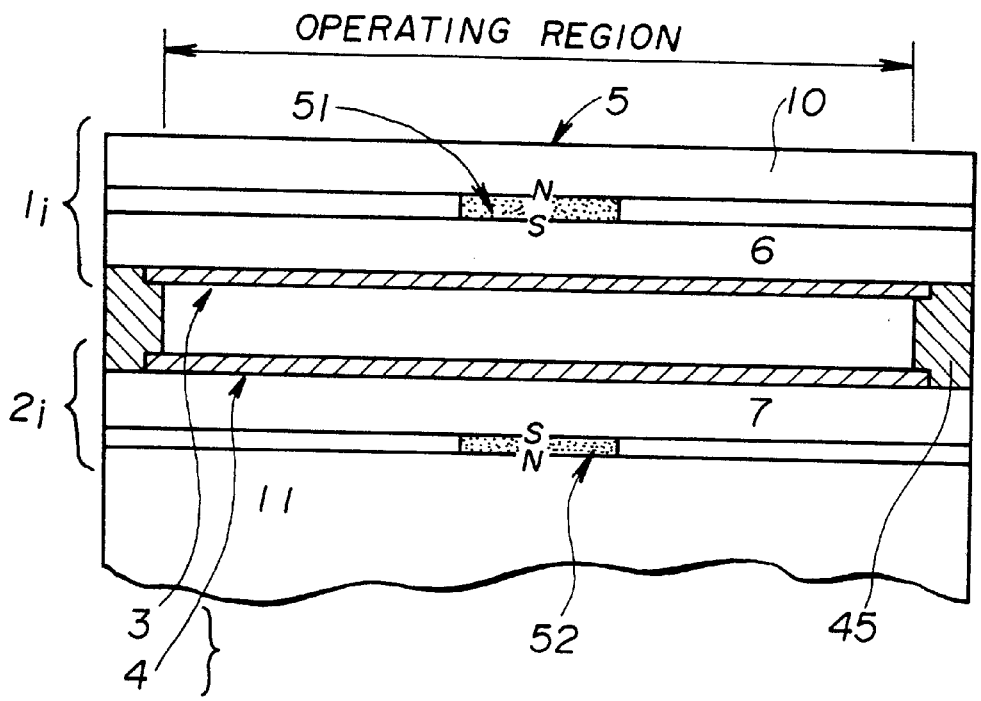
FIGS. 18A and 18B are a cross-sectional diagram and a plan view, respectively, showing a ninth embodiment of the coordinate input pad of the present invention.
Figure 18B:
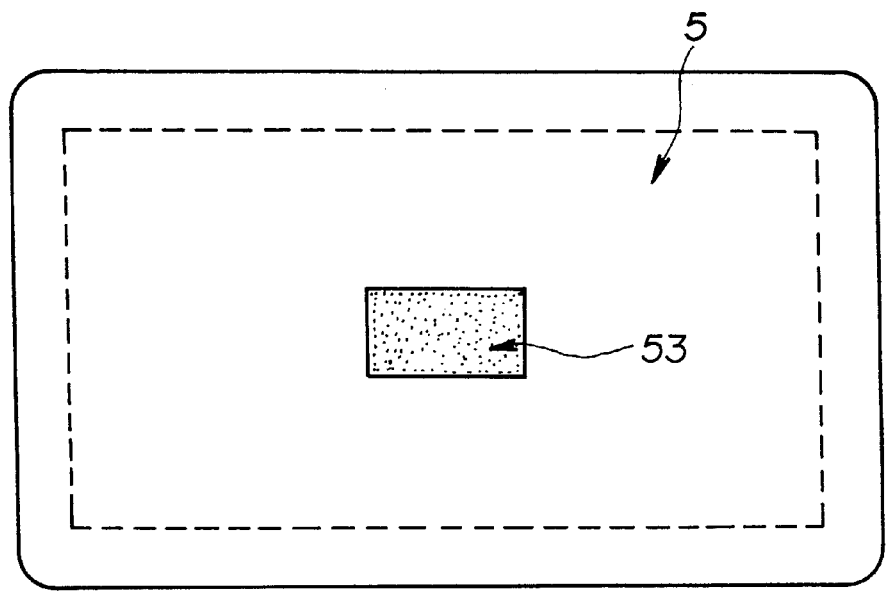

FIGS. 18A and 18B are a cross-sectional diagram and a plan view, respectively, showing a ninth embodiment of the coordinate input pad of the present invention. An upper sheet 1i includes a resin film 6 used as a base material. The resin film 6 is provided with a printed film magnet 51 laminated on one of the surfaces. The resistive layer 3 and electrode patterns and wiring patterns (not shown) are laminated either on the printed film magnet 51 or on the other surface of the resin film 6. (In FIG. 18a, the latter case is shown for the sake of convenience of illustration.) The resin film 6 may be made of a material such as PET, PC or polyimide. The printed film magnet 51, in otherwords, film-like magnet, is printed at a central position 53 of the operating region. Similarly, a lower sheet 2i includes a resin film 7 used as a base material. The resin film 7 is provided with a printed film magnet 52 laminated on one of the surfaces. The resistive layer 4 and electrode patterns and wiring patterns (not shown) are laminated either on the printed film magnet 52 or on the other surface of the resin film 7. (In FIG. 18a, the latter case is shown for the sake of convenience of illustration.) The resin film 7 may be made of a material such as PET, PC or polyimide. The printed film magnet 52, in other words, film-like magnet, is printed at the central position 53 of the operating region.

Further, the above-described laminated structures including the upper sheet 1i and the lower sheet 2i are resist coated. The printed film magnets 51, 52 are magnetized in a thickness direction in such a manner that opposing surfaces will have the same polarity of either N-poles or S-poles. Then, the upper sheet 1i is placed over the lower sheet 2i with their surfaces having the same polarity opposing each other. The upper and lower sheets 1i and 2i are joined at the periphery with joining parts 45 being placed between the upper and lower sheets 1i and 2i. Then, the upper and lower sheets 1i and 2i are mounted on a mounting board 11. In order to protect the upper sheet 1i and to improve the sense of touch of the operating surface 5, a protective sheet 10 is provided on the operating surface 5 of the upper sheet 1i.

With the coordinate input pad shown in FIGS. 18A and 18B, the upper and lower sheets 1i and 2i will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 19:
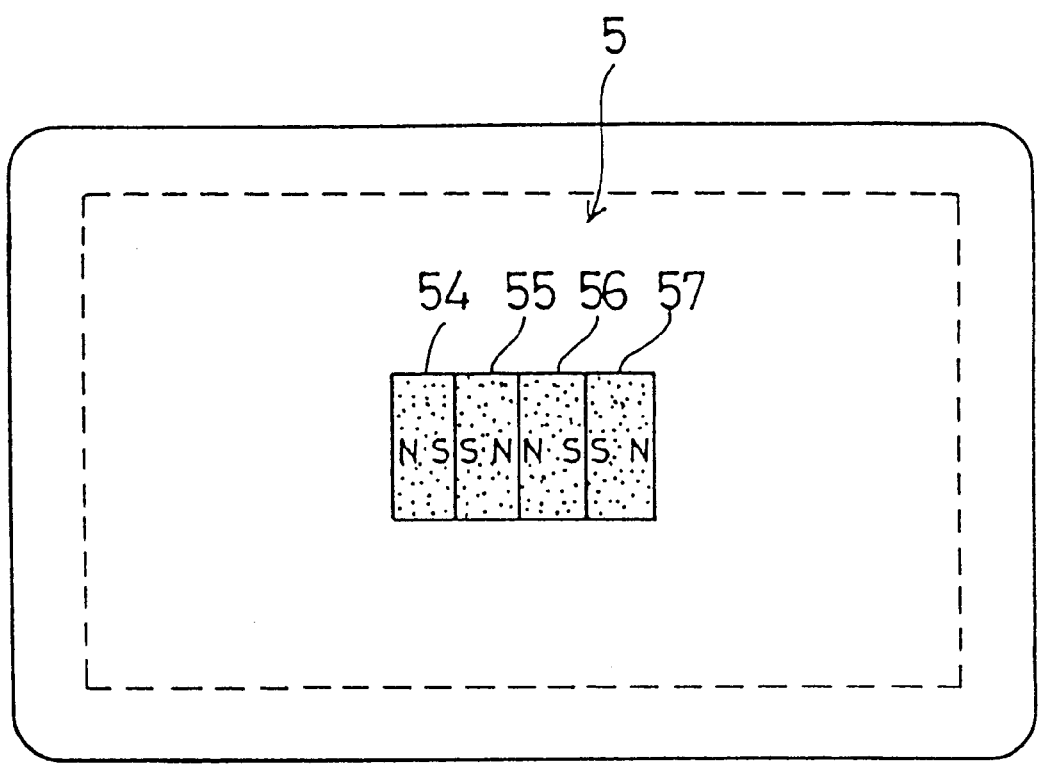
FIG. 19 is a plan view showing a tenth embodiment of the coordinate input pad of the present invention.

FIG. 19 is a plan view showing a tenth embodiment of the coordinate input pad of the present invention. The present embodiment is a variation of the embodiment shown in FIGS. 18A and 18B. An upper sheet 1i includes a resin film 6 used as a base material. The resin film 6 is provided with a plurality of printed film magnets 54, 55, 56, 57 laminated on one of the surfaces of the resin film 6. The resistive layer 3 and electrode patterns and wiring patterns (not shown) are laminated either on the plurality of printed film magnets 54, 55, 56, 57 or on the other surface of the resin film 6. (In FIG. 18a, the latter case is shown for the sake of convenience of illustration.) The resin film 6 may be made of a material such as PET, PC or polyimide. The printed film magnets 54, 55, 56, 57, in other words, film-like magnets, are printed at the central position 53 of the operating region. Similarly, a lower sheet 2i includes a resin film 7 used as a base material. The resin film 7 is provided with a plurality of printed film magnets 54, 55, 56, 57 laminated on one of the surfaces. The resistive layer 4 and electrode patterns and wiring patterns (not shown) are laminated either on the plurality of printed film magnets 54, 55, 56, 57 or on the other surface of the resin film 7. (In FIG. 18a, the latter case is shown for the sake of convenience of illustration.) The resin film 7 may be made of a material such as PET, PC or polyimide. The printed film magnets 54, 55, 56, 57, in other words, film-like magnets, are printed at the central position 53 of the operating region.

Further, the above-described laminated structures including the upper sheet 1i and the lower sheet 2i are resist coated. The printed film magnets 54, 55, 56, 57 of the upper and lower sheets 1i and 2i are magnetized in a transverse direction in such a manner that opposing surfaces will have the same polarity of either N-poles or S-poles. Then, the upper sheet 1i is placed over the lower sheet 2i with their surfaces having the same polarity opposing each other. The upper and lower sheets 1i and 2i are joined at the periphery with joining parts 45 being placed between the upper and lower sheets 1i and 2i. Then, the upper and lower sheets 1i and 2i are mounted on a mounting board 11. In order to protect the upper sheet 1i and to improve the sense of touch of the operating surface 5, a protective sheet 10 is provided on the operating surface 5 of the upper sheet 1i.

With the coordinate input pad shown in FIG. 19, the upper and lower sheets 1i and 2i will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 20:
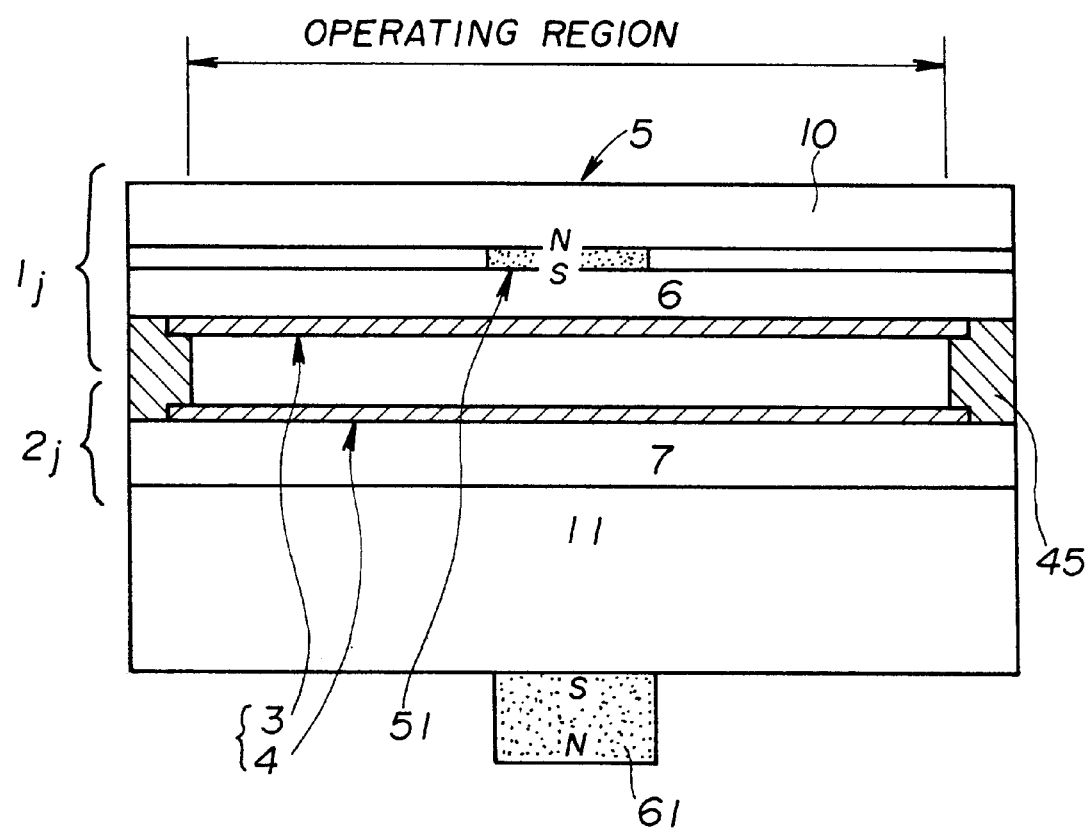
FIG. 20 is a cross-sectional diagram showing an eleventh embodiment of the coordinate input pad of the present invention.

FIG. 20 is a cross-sectional diagram showing an eleventh embodiment of the coordinate input pad of the present invention. An upper sheet 1j includes a resin film 6 used as a base material. The resin film 6 is provided with a printed film magnet 51 on one of the surfaces of the resin film 6. The resistive layer 3 and electrode patterns and wiring patterns (not shown) are laminated either on the printed film magnet 51 or on the other surface of the resin film 6. (In FIG. 20, the latter case is shown for the sake of convenience of illustration.) The resin film 6 may be made of a material such as PET, PC or polyimide. The printed film magnet 51, in other words, film-like magnet, is printed at a central position of the operating region. Also, a lower sheet 2j includes a resin film 7 used as a base material. The resin film 7 is provided with the resistive layer 4 and electrode patterns and wiring patterns (not shown) on one of the surfaces of the resin film 7. The resin film 7 may be made of a material such as PET, PC or polyimide. A permanent magnet 61 is mounted on the mounting board 11 at the central position of the operating region.

Further, the above-described laminated structures including the upper sheet 1j and the lower sheet 2j are resist coated. The printed film magnet 51 is magnetized in a thickness direction in such a manner that opposing surfaces of the printed film magnet 51 and the permanent magnet 61 will have the same polarity of either N-poles or S-poles. Then, the upper sheet 1j is placed over the lower sheet 2j with their surfaces having the same polarity opposing each other. The upper and lower sheets 1j and 2j are joined at the periphery with joining parts 45 being placed between the upper and lower sheets 1j and 2j. In order to protect the upper sheet 1j and to improve the sense of touch of the operating surface 5, a protective sheet 10 is provided on the operating surface 5 of the upper sheet 1j.

With the coordinate input pad shown in FIG. 20, the upper and lower sheets 1j and 2j will not come in contact when the coordinate input pad is not pressed. Therefore, it is possible to prevent problems related to an unintended short circuit. Also, when there is a touch on the coordinate input pad, accurate data can be obtained since there is no insulating material such as dot spacers between the resistive films.

Figure 21A:
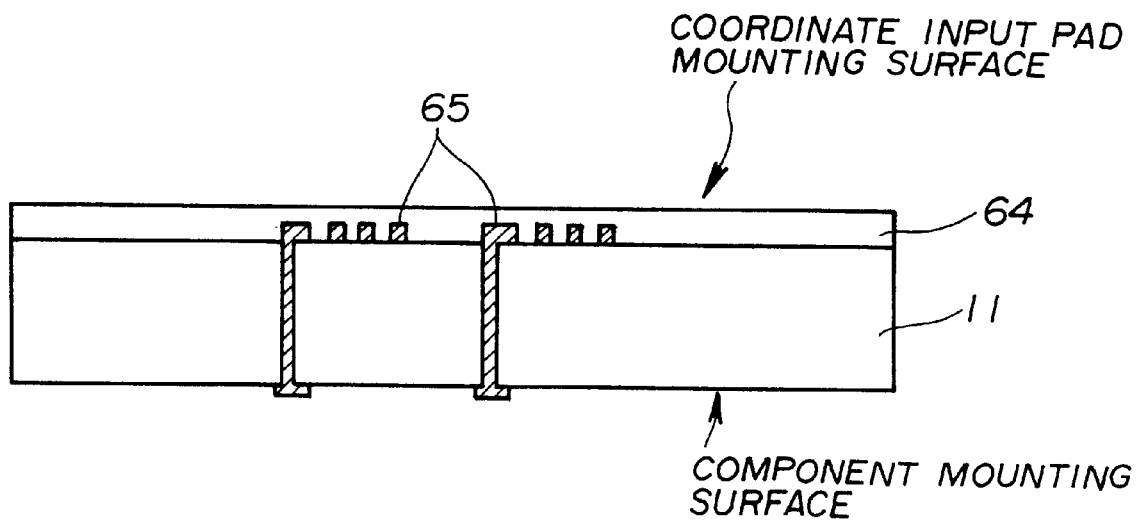
FIGS. 21A and 21B are a cross-sectional diagram and a plan view, respectively, showing a twelfth embodiment of the coordinate input pad of the present invention.
Figure 21B:
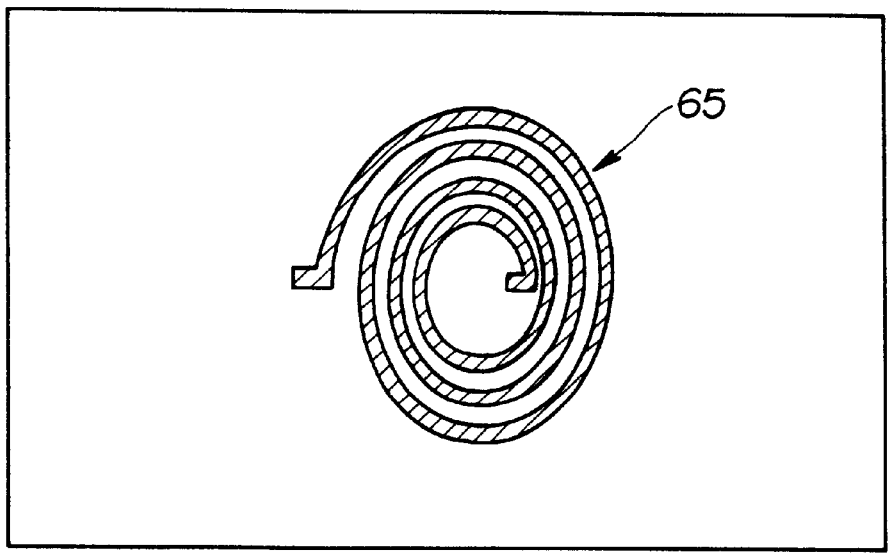

FIGS. 21A and 21B are a cross-sectional diagram and a plan view, respectively, showing a twelfth embodiment of the coordinate input pad of the present invention.

The coordinate input pad of the twelfth embodiment is similar to the coordinate input pad shown in FIG. 20 except that the permanent magnet 61 is replaced by a coil pattern 65 which is provided in an insulating layer 64 and can serve as a magnet. A magnetic field is induced by a current through the coil pattern 65, so that it is possible to obtain an effect similar to that of the coordinate input pad shown in FIG. 20. Further, a similar effect can be obtained when the print film magnet 51 on the upper sheet 1j is replaced by a coil pattern, which may serve as a magnet.

Now, one of the structures of the coordinate-detecting device using one of the coordinate input pads described in the above-described embodiments will be described in detail.

Figure 22:
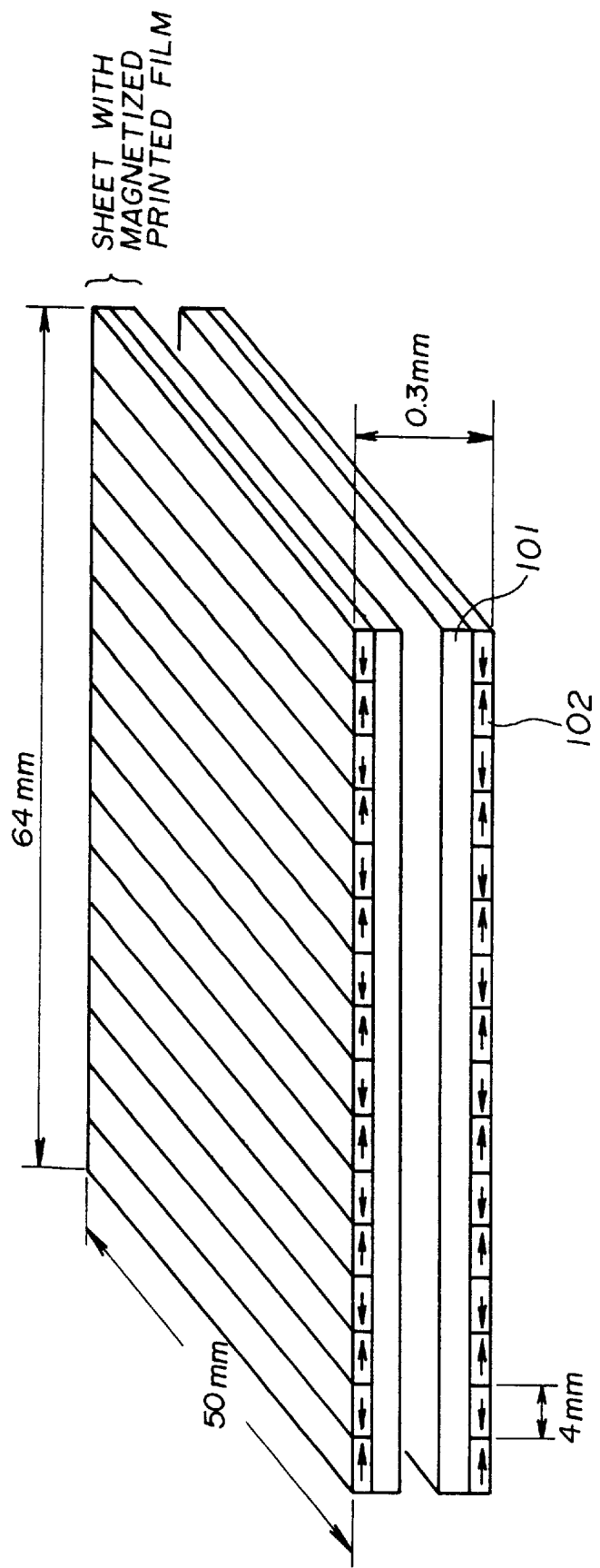
FIG. 22 is a perspective diagram showing a magnetic printed film.

FIG. 22 is a perspective diagram showing a magnetic printed film. In the present embodiment, a PET film 101 is used as a resin film. The PET film 101 having a 100-$\mu$m thickness is provided with a magnetic printed film 102 having a 30-$\mu$m thickness. The PET film 101 is, for example, provided with uniformly spread paste made of a binder (epoxy) in which SmCo powder is distributed. The paste is then subjected to a heat curing process. The SmCo powder naturally has magnetic characteristics of a coercive force Hc=7000–10000e and a residual magnetic flux density Br=9000–12000G. However, with the magnetic printed film 102, since the SmCo powder is distributed in the binder (epoxy), the magnetic characteristics will be decreased to a coercive force Hc=5000e and a residual magnetic flux density Br=5000G.

As shown in FIG. 22, the magnetic printed film 102 is magnetized at a pitch of 4 mm with reversed directions of magnetization. When such sheets with magnetized printed film are placed over one another with the poles having the same polarity opposing each other, a repulsive force of approximately 3 g is produced at a central region of approximately 20 mm×20 mm. Therefore, when a pressure exerted on the coordinate-detecting device is less than 3 g (i.e., in a normal state), the upper and lower sheets will not come in contact due to the repulsive force of 3 g.

The coordinate-detecting device having the above-described magnetic printed film 102 is manufactured according to the following steps.

First, in order to provide the magnetic printed film 102, paste prepared by mixing a ferromagnetic material powder such as SmCo into a binder (e.g., epoxy) is uniformly printed on one of the surfaces of the PET film 101.

Figure 23:
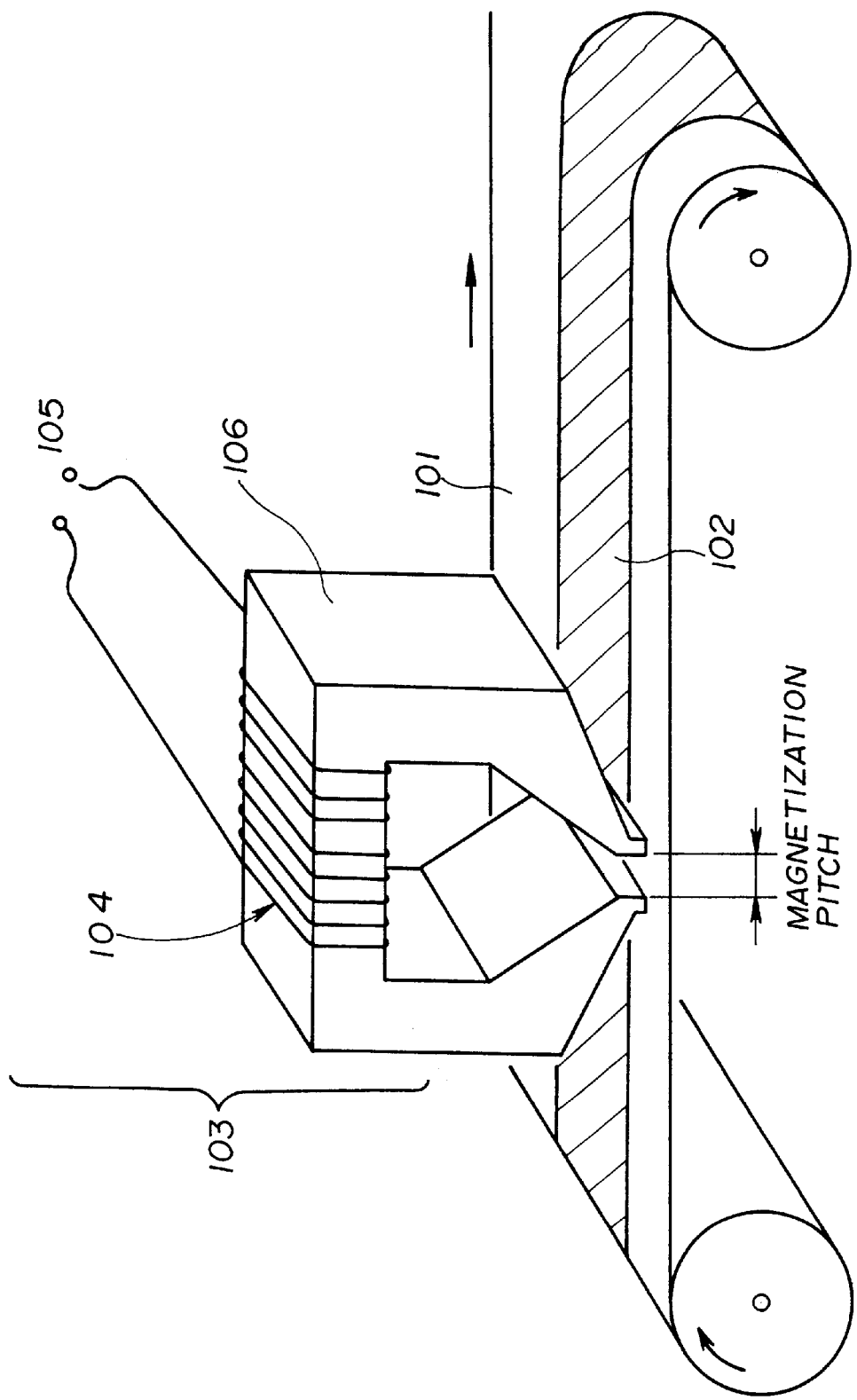
FIG. 23 is a diagram showing a method of magnetizing the magnetic printed film shown in FIG. 22.

Secondly, the magnetic printed film 102 having reverse directions of magnetization is formed by using a magnetizing head 103 as shown in FIG. 23. As the PET film 101 is forwarded by a distance corresponding to a magnetization pitch, the direction of a current supplied by power supply terminals 105 and flowing through a coil 104 wound on a yoke 106 is reversed. Thus, the magnetic printed film 102 is formed in which the direction of magnetization alters at a constant pitch. In the present embodiment, one magnetization head is used. However, when a PET film of a greater width is used for mass-production, it is possible to arrange a plurality of magnetization heads.

Figure 24:
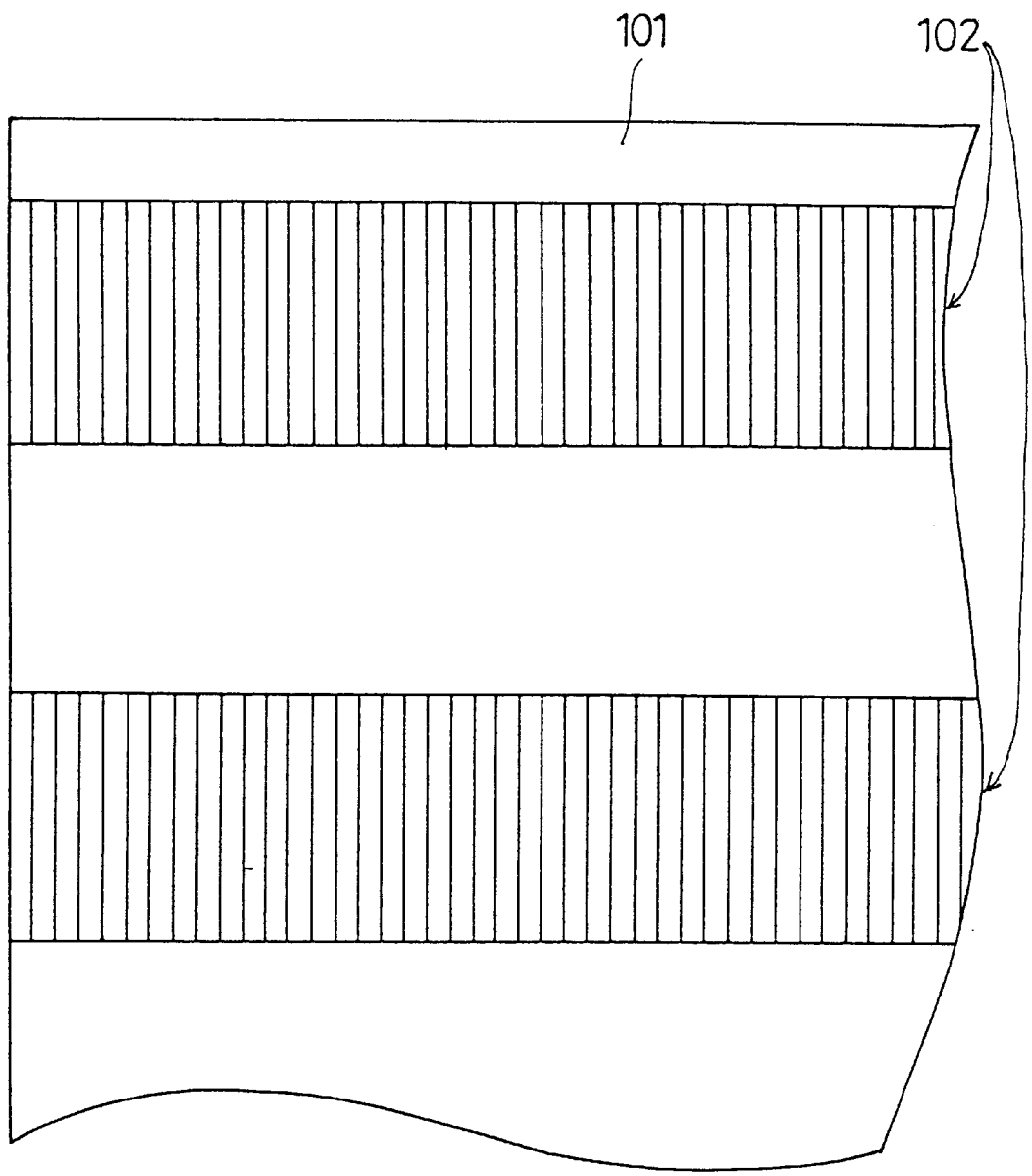
FIG. 24 is a partial diagram showing a step of cutting out a PET film provided with the magnetic printed film.
Figure 25:
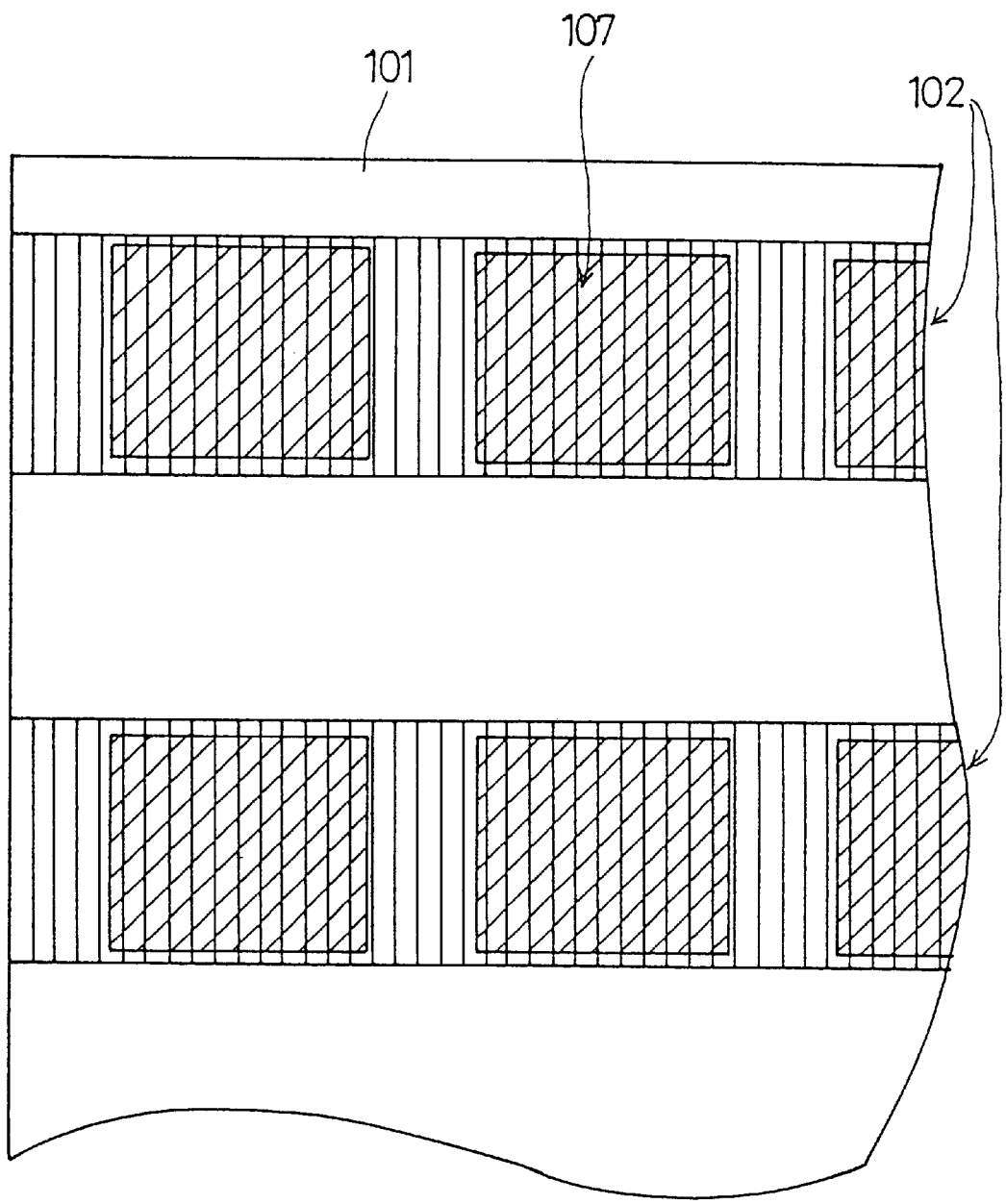
FIG. 25 is a partial diagram showing a step of providing resistive films on the PET film shown in FIG. 24.

Thirdly, in order to improve the operability of subsequent steps, the PET film 101 is cut as shown in FIG. 24. Fourth, resistive films 107 are screen-printed on the other surface of the PET film 101 as shown in FIG. 25. Subsequently, wiring patterns, resist patterns and adhesive layers are provided using a screen-printing technique.

Figure 26:
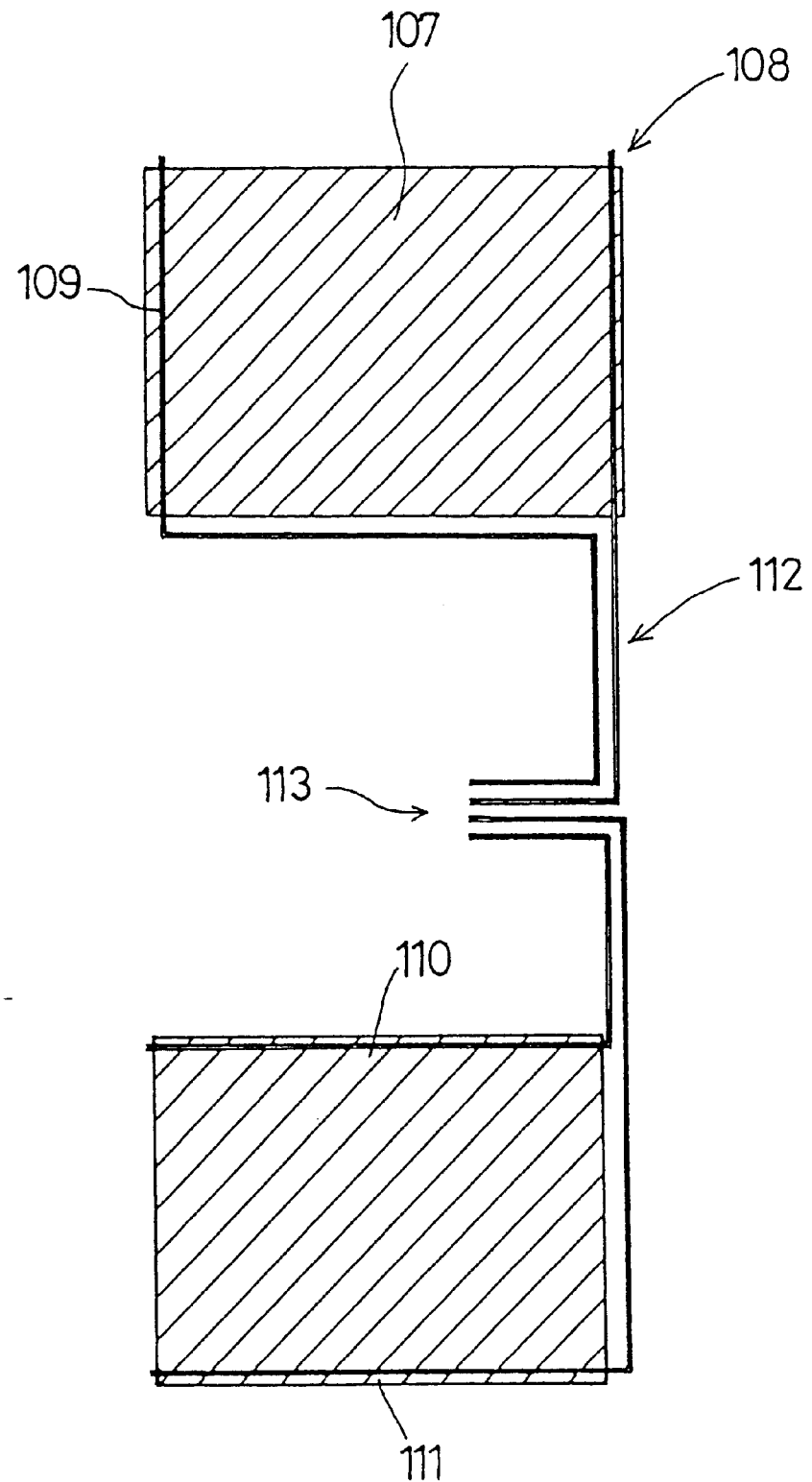
FIG. 26 is a diagram showing a step of providing wiring patterns and electrodes using a conductive material.

Fifth, as shown in FIG. 26, electrodes 108, 109, 110, 111 and the wiring patterns 112 are provided by screen-printing a conductive material.

Figure 27:
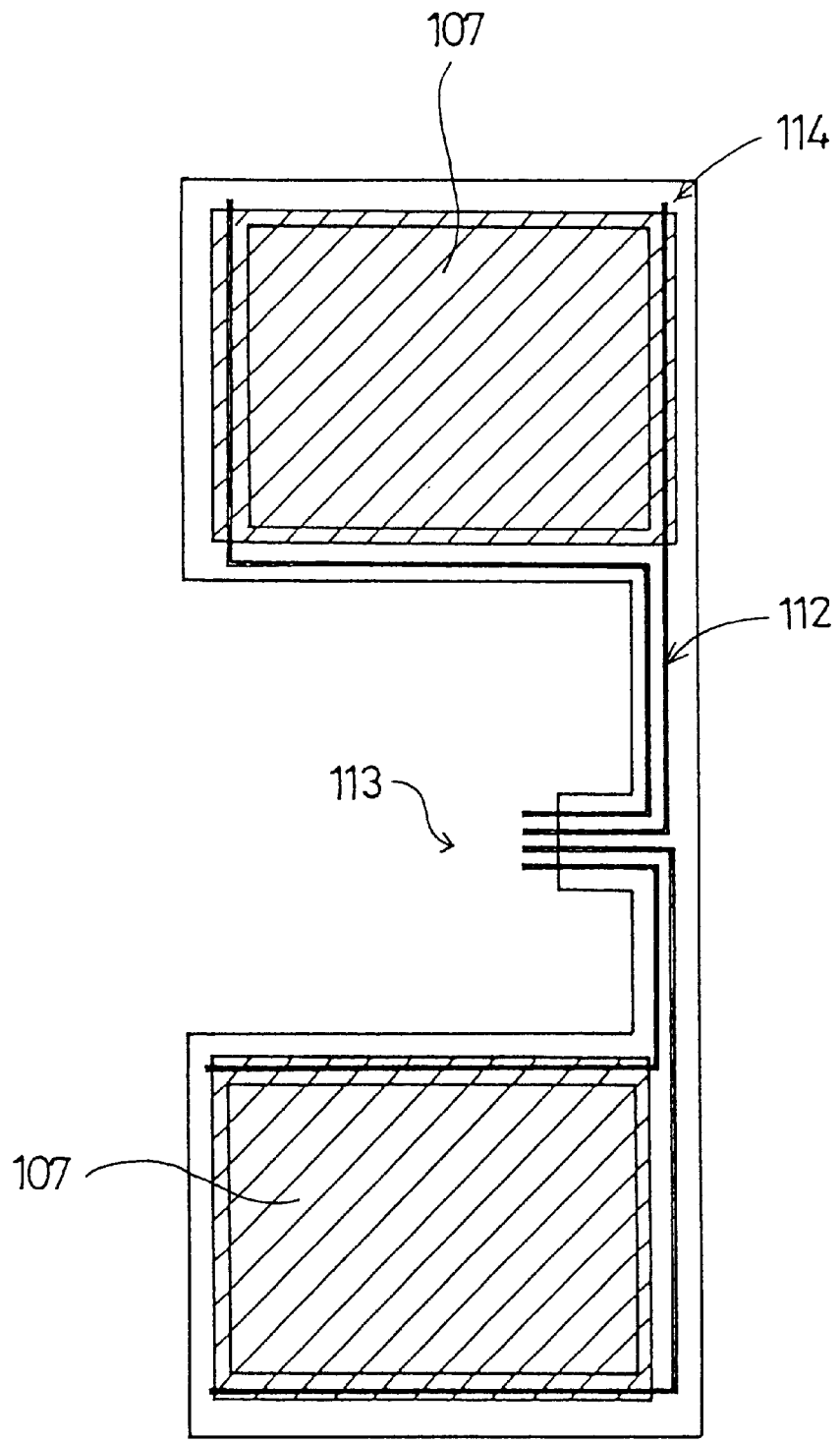
FIG. 27 is a diagram showing a step of providing resist patterns.

Sixth, as shown in FIG. 27, an insulating layer or resist patterns 114 are provided except for a position over a connecting terminal part 113, in order that the wiring patterns 112 will not be short-circuited when the upper and lower sheets are joined together.

Figure 28:
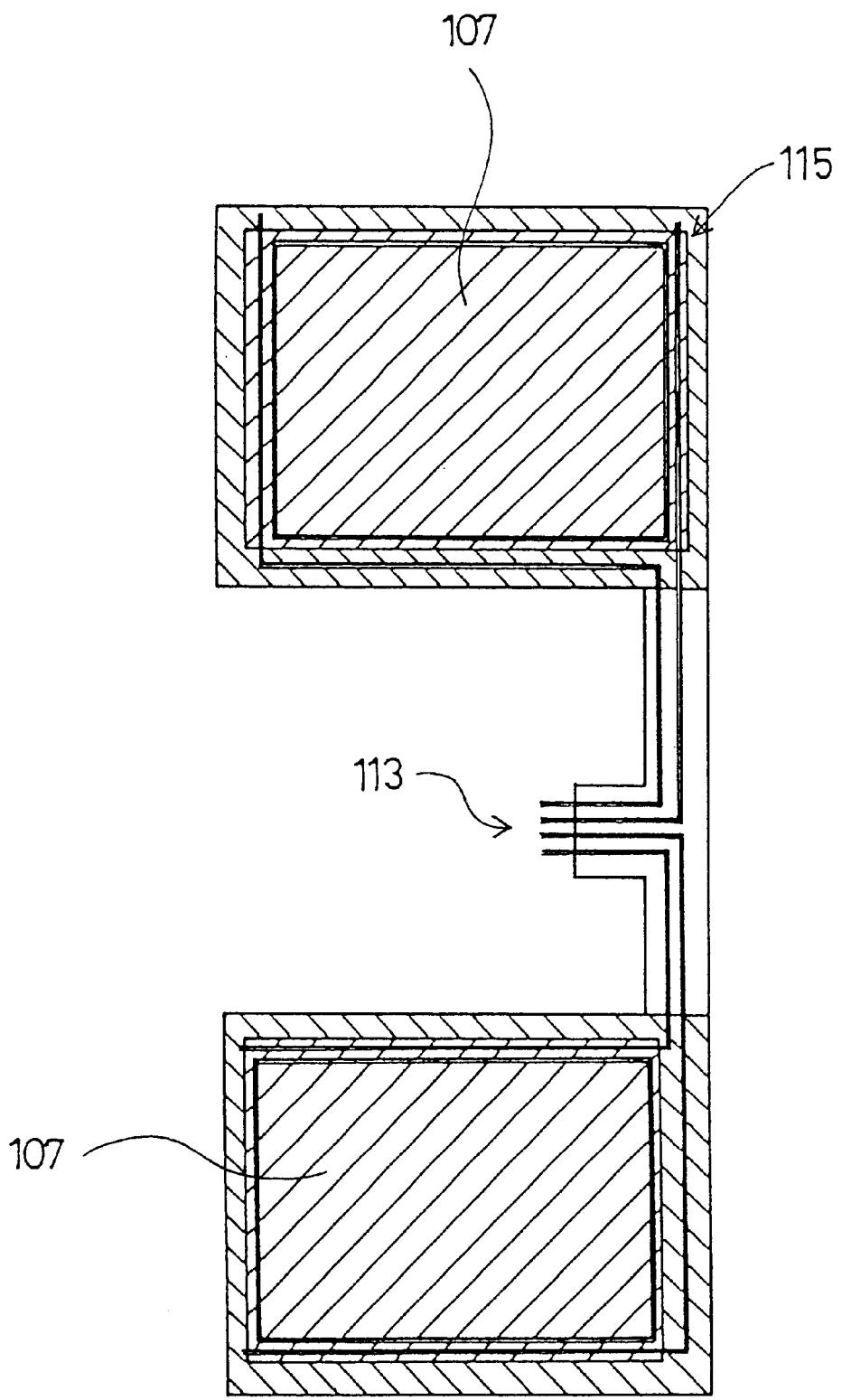
FIG. 28 is a diagram showing a step of providing an adhesive layer.

Seventh, as shown in FIG. 28, an adhesive layer 115 is provided at the peripheral part of the operating region, so as to serve as an adhesive for joining the upper and lower sheets.

Figure 29A:
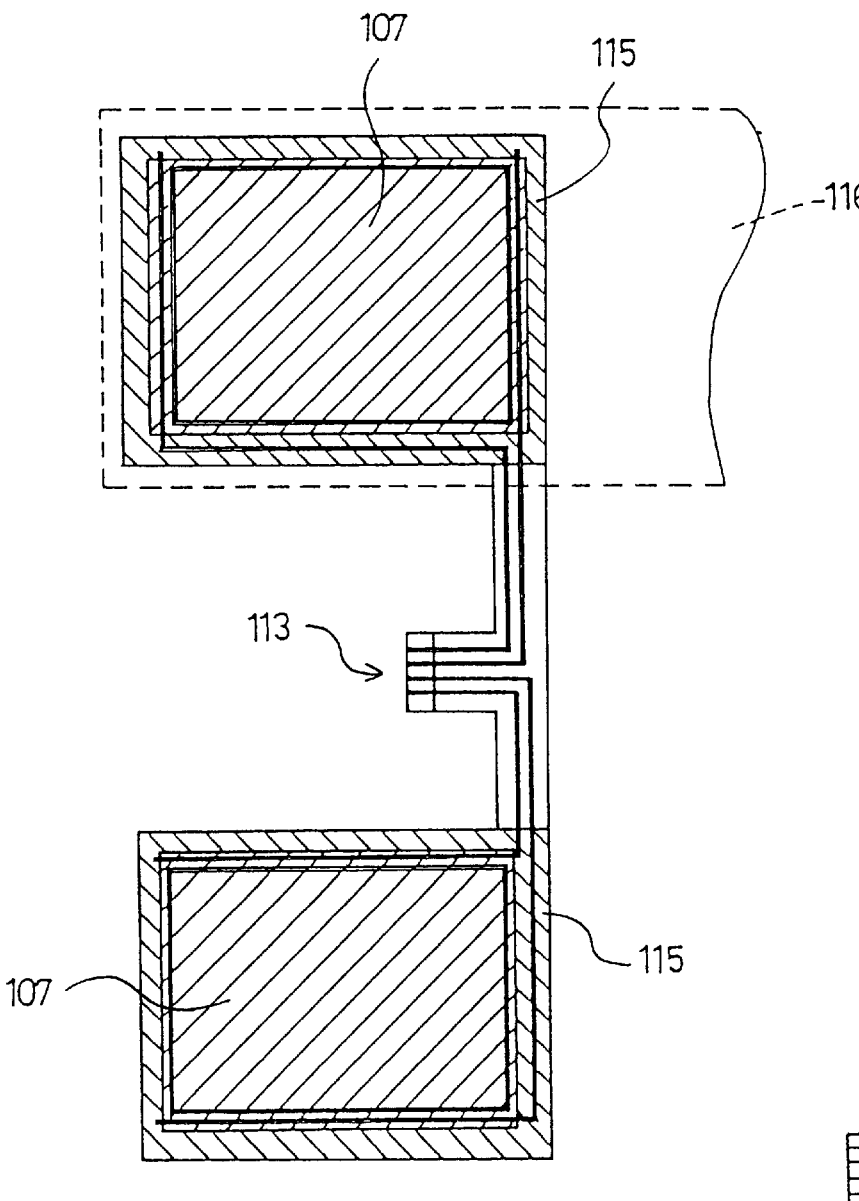
FIG. 29A is a diagram showing a step of stamping and FIG. 29B is a diagram showing a step of laminating.
Figure 29B:
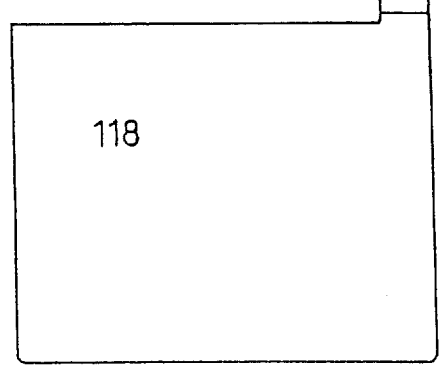

Eighth, in the present embodiment, there is provided a protective layer made of PET film. As shown in FIG. 29, a protective sheet 116 is provided on the upper sheet, and is stamped into a shape corresponding to a shape of an unfolded coordinate-detecting device. Further, as shown in FIG. 29B, the stamped out sheets are joined together such that magnetic poles having the same polarity oppose each other.

The coordinate input pad manufactured by the above-described steps is mounted on the mounting board and then connected to an external circuit via the connecting terminal part 113. Thus, the coordinate input pad can be used as a coordinate input device of electronic devices such as a personal computer.

Figure 31:
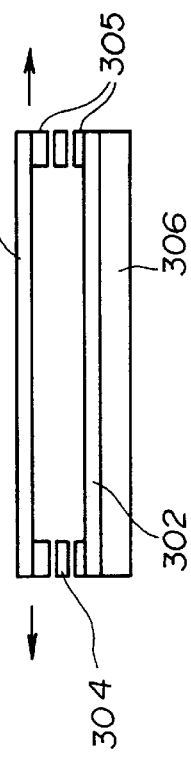
FIG. 31 is a cross-sectional diagram showing a thirteenth embodiment of the coordinate input pad of the present invention.

FIG. 31 is a cross-sectional diagram showing a thirteenth embodiment of the coordinate input pad of the present invention.

FIG. 31 shows a coordinate input pad having an upper sheet 300, a lower sheet 302 and spacers 304 provided between the upper and lower sheets 300, 302. The upper and lower sheets 300, 302 are joined together via the spacers 304 by means of adhesive layers 305 provided between the upper and lower layers 300, 302 and the spacers 304. Since the upper sheet 300 is tensed, the upper sheet 300 and the lower sheet 302 are provided so as to oppose each other with a predetermined gap. The coordinate input pad further includes a mounting board 306 which is provided at a lower surface of the lower sheet 302.

The upper sheet 300 and the lower sheet 302 are resin films which may be made of such as PET, PC or polyimide and each has a thickness of approximately 0.1 mm. Preferably, the spacers 304 are made of an insulating material. As has been described above with the first to twelfth embodiments, the upper and lower sheets 300, 302 are provided with pairs of electrodes, which are formed along the edges and located at opposite sides of central input regions. However, for the sake of convenience, in the following embodiments including the present thirteenth embodiment, the electrodes are omitted from the illustration. Also, the mounting board is omitted.

The coordinate-detecting device of the thirteenth embodiment is different from the coordinate-detecting device of the prior art having dot spacers made of an insulating material provided between opposing top and bottom sheets made of resistive sheets. The difference is that the upper and lower sheets 300, 302 oppose each other at a predetermined gap by means of a tension in the upper sheet 300. Only when the coordinate input pad is pressed, will the upper sheet 300 and the lower sheet 302 be in contact. When the pressure is released, the upper and lower sheets 300, 302 will return to their original positions with the predetermined gap by means of the tension in the upper sheet 300. Also, when used in the coordinate-detecting device, even if the upper sheet 300 deteriorates with age and a deformation such as a distortion occurs, the predetermined gap between the upper and lower sheets 300, 302 will be maintained due to the tension in the upper sheet 300.

Therefore, with the coordinate-detecting device of the thirteenth embodiment, a disadvantage of the related art, in which disadvantage the resistive films come in to contact at locations surrounding a dot spacer and thus the detected data becomes unstable, can be avoided. It is possible to detect accurate coordinate data at any point of the coordinate input pad. Also, when used in the coordinate-detecting device, even if there is a deformation of the sheet due to the deterioration with age, the sheets will not be short-circuited.

Figure 32:
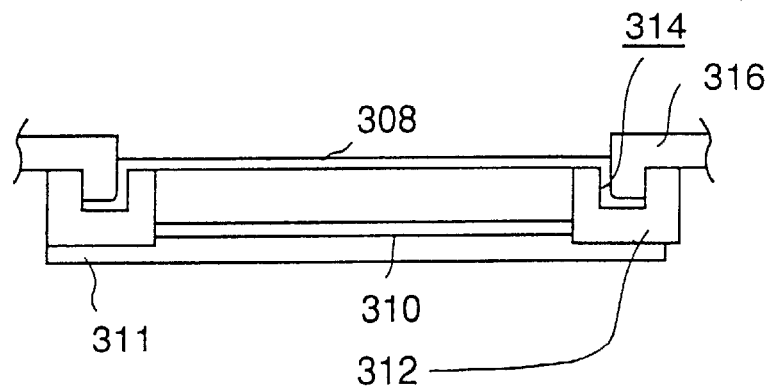
FIG. 32 is a cross-sectional diagram showing a fourteenth embodiment of the coordinate input pad of the present invention.

FIG. 32 is a cross-sectional diagram showing a fourteenth embodiment of the coordinate input pad of the present invention.

FIG. 32 shows a coordinate input pad having an upper sheet 308 and a lower sheet 310, which are joined to an attachment housing 312 provided on a mounting board 311 of the coordinate-detecting device so as to oppose each other with a predetermined gap. The upper sheet 308 is tensed since the peripheral part of the upper sheet 308 is pushed into a groove part 314 formed on the attachment housing 213 by means of a pressure member 316.

The coordinate-detecting device of the fourteenth embodiment is different from the coordinate-detecting device of the prior art having dot spacers made of an insulating material provided between opposing top and bottom sheets made of resistive sheets. The difference is that the upper and lower sheets 308, 310 oppose each other at a predetermined gap by means of a tension in the upper sheet 308. Only when the coordinate input pad is pressed, will the upper sheet 308 and the lower sheet 310 be in contact. When the pressure is released, the upper and lower sheets 308, 310 will return to their original positions with the predetermined gap by means of the tension in the upper sheet 308. Also, when used in the coordinate-detecting device, even if the upper sheet 308 deteriorates with age and a deformation such as a distortion occurs, the predetermined gap between the upper and lower sheets 308, 310 will be maintained due to the tension in the upper sheet 308.

Therefore, with the coordinate-detecting device of the fourteenth embodiment, a disadvantage of the related art, in which disadvantage the resistive films come into contact at locations surrounding a dot spacer and thus the detected data becomes unstable, can be avoided. It is possible to detect accurate coordinate data at any point of the coordinate input pad. Also, when used in the coordinate-detecting device, even if there is a deformation of the sheet due to the deterioration with age, the sheets will not be short-circuited.

Figure 33A:
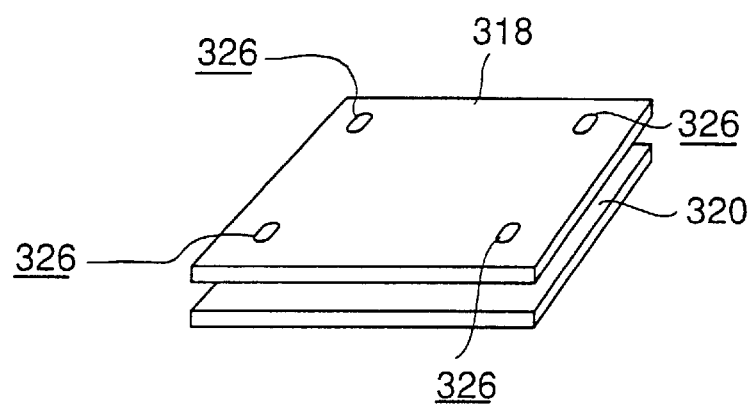
FIGS. 33A and 33B are a perspective diagram and a cross-sectional diagram, respectively, showing a fifteenth embodiment of the coordinate input pad of the present invention.
Figure 33B:
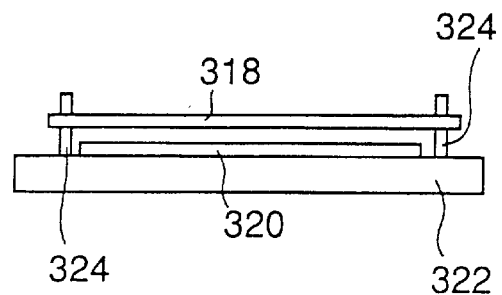

FIGS. 33A and 33B are a perspective diagram and a cross-sectional diagram, respectively, showing a fifteenth embodiment of the coordinate input pad of the present invention.

In the fifteenth embodiment shown in FIGS. 33A and 33B, guide pins 324 are provided instead of the attachment housing provided in the coordinate-detecting device of the fourteenth embodiment. An upper sheet 318 is attached on the guide pins 324 provided upright on a mounting board 322 on which a lower sheet 320 is provided. The upper sheet 318 has holes 326 that are provided at a smaller pitch compared to that of the guide pins 324. The upper sheet 318 is slightly tensed so that the pitch between the holes 326 will be widened so as to correspond to the pitch between the guide pins 324. Then, the guide pins 324 are penetrated into the holes of the upper sheet 318. This structure gives a similar effect to that obtained by the coordinate input pad of the fourteenth embodiment.

Figure 34:
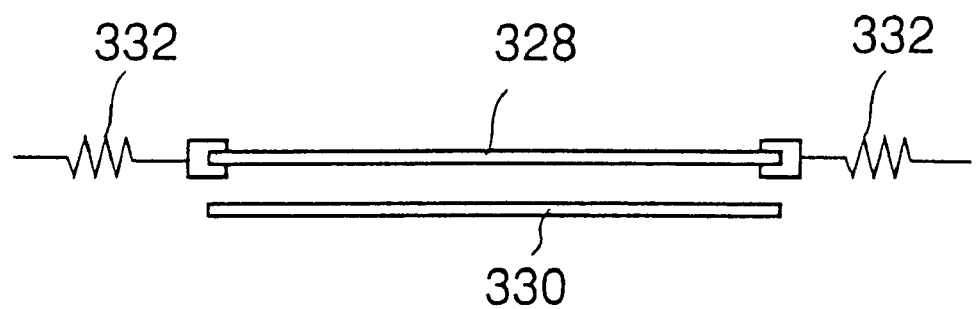
FIG. 34 is a cross-sectional diagram showing a sixteenth embodiment of the coordinate input pad of the present invention.

FIG. 34 is a cross-sectional diagram showing a sixteenth embodiment of the coordinate input pad of the present invention. In this embodiment, the coordinate input pad has an upper sheet 328 and a lower sheet 330. It is preferable that the peripheral part of the upper sheet 328 be attached to an attachment housing, not shown, via elastic members 332 such as coil springs. Such a structure positively gives a tension in the upper sheet 328.

Figure 35A:
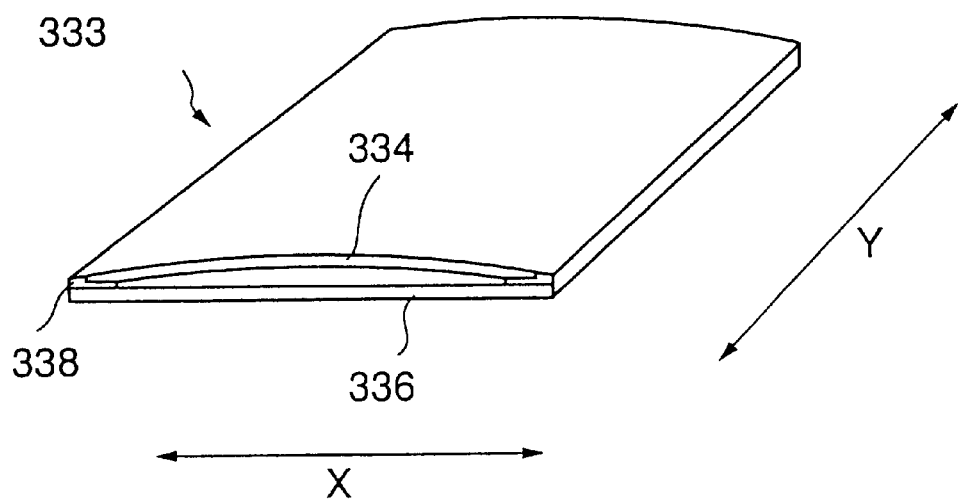
FIG. 35A is a perspective view showing a seventeenth embodiment of the coordinate input pad of the present invention and FIG. 35B is a plan view showing the coordinate input pad shown in FIG. 35A incorporated in a keyboard.
Figure 35B:
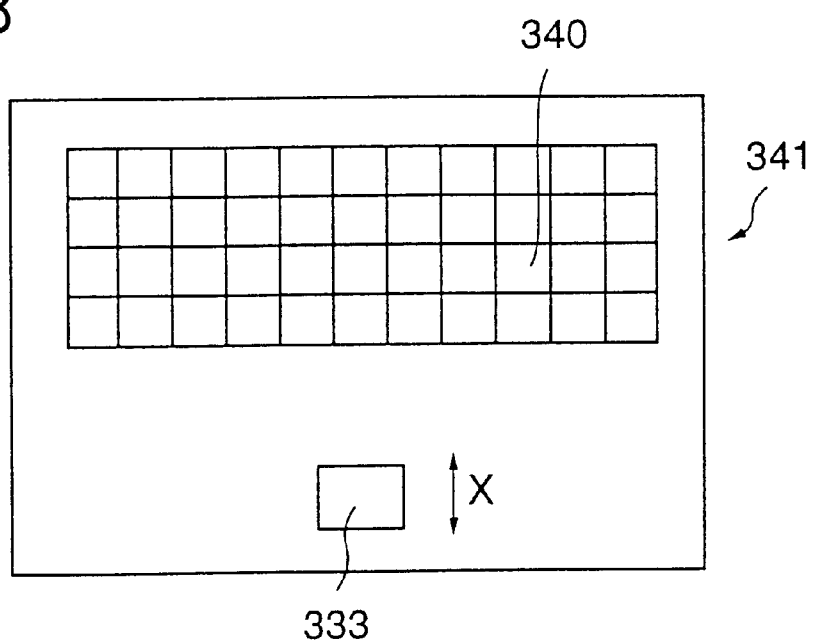

FIG. 35A is a perspective view showing a seventeenth embodiment of the coordinate input pad of the present invention and FIG. 35B is a plan view showing the coordinate input pad shown in FIG. 35A incorporated in a keyboard. FIGS. 35A and 35B show a coordinate input panel 333 having an upper sheet 334 and a lower sheet 336 joined together at a predetermined gap by means of an adhesive film 338 in such a manner that a central part of the upper sheet 334 is bent upwards with in an X-direction. For example, as shown in FIG. 35B, on an operating surface 341 of a computer, the coordinate input panel 333 may be provided in such a manner that the raised part is parallel to the width direction of the keyboard. Also, in the present embodiment, the coordinate input panel 333 is bent in the X-direction, but bending in the Y-direction is also possible.

The upper sheet 334 and the lower sheet 336 are resin films which may be made of such as PET, PC or polyimide and each has a thickness of approximately 0.1 mm. As mentioned above, the upper sheet 334 and the lower sheet 336 are joined together at the predetermined gap by means of the adhesive film 338. Also, if desired, an insulating member (not shown) may be provided between the upper and lower sheets 336.

The coordinate input pad of the. seventeenth embodiment is different from the coordinate input pad of the prior art having dot spacers made of an insulating material provided between opposing top and bottom sheets made of resistive sheets. The difference is that the upper and lower sheets 334, 336 oppose each other at a predetermined gap with the upper sheet 334 being bent upwards at its central part. Only when the coordinate input panel 333 is pressed, will the upper sheet 334 and the lower sheet 336 be in contact. When the pressure is released, the upper and lower sheets 334, 336 will return to their original positions with the predetermined gap due to the recovering force in the upper sheet 334. Also, when used in the coordinate-detecting device, even if the upper sheet 334 deteriorates with age and a deformation such as a distortion occurs, the predetermined gap between the upper and lower sheets 334, 336 will be maintained since the upper sheet 300 is bent upwards at its central part.

Therefore, with the coordinate input pad of the seventeenth embodiment, a disadvantage of the related art, in which disadvantage the resistive films come into contact at locations surrounding a dot spacer and thus the detected data becomes unstable, can be avoided. It is possible to detect accurate coordinate data at any point of the coordinate input pad 333.

The above-described coordinate input pad having an upper sheet bent upwards at its central part can be embodied as shown in FIG. 36. FIG. 36 is a cross-sectional diagram showing an eighteenth embodiment of the coordinate input pad of the present invention.

The eighteenth embodiment includes attachment housings 342 tapered such that the height is reduced at outer parts. A lower sheet 344 is attached to side surfaces of the attachment housings 342 and an upper sheet 346 is attached to upper surfaces of the attachment housings 342. Thus, the upper sheet 346 is bent such that it is raised at its central part.

FIGS. 37A to 37C are cross-sectional diagrams showing a nineteenth embodiment of the coordinate input pad of the present invention.

As shown in FIG. 37A, a protective sheet 350 is provided on an upper surface of an upper sheet 348 with the upper sheet 348 being tensed. Then, as shown in FIG. 37B, due to the contraction of the upper sheet 348, the upper sheet 348 is bent such that its central part is raised. Finally, as shown in FIG. 37C, a lower sheet 352 is joined to the upper sheet 348.

FIGS. 38A to 38D are cross-sectional diagrams showing a twentieth embodiment of the coordinate input pad of the present invention.

Figure 38A:
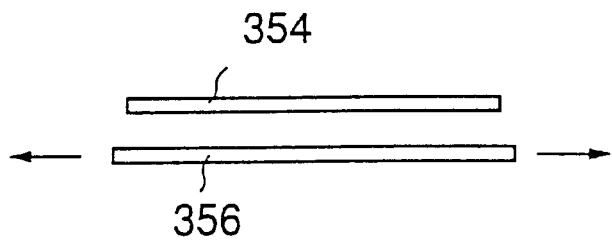
FIGS. 38A to 38D are cross-sectional diagrams showing a twentieth embodiment of the coordinate input pad of the present invention.
Figure 38B:
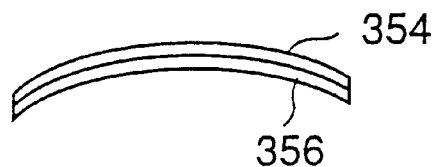
Figure 38C:
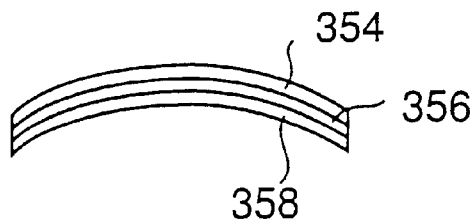
Figure 38D:
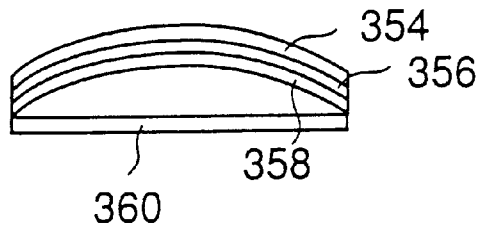

As shown in FIG. 38A, a double-sided adhesive tape 356 is provided on a lower surface of a protective sheet 354 with the double-sided adhesive tape 356 being tensed. Then, as shown in FIG. 38B, due to the contraction of the adhesive tape 356, the protective sheet 354 is bent such that its central part is raised. As shown in FIG. 38C, the double-sided adhesive tape 356 having the protective film 354 is provided on an upper surface of an upper sheet 358, such that the upper sheet 358 is bent with its central part being raised. Finally, as shown in FIG. 38D, a lower sheet 360 is joined to the upper sheet 358.

Figure 39A:
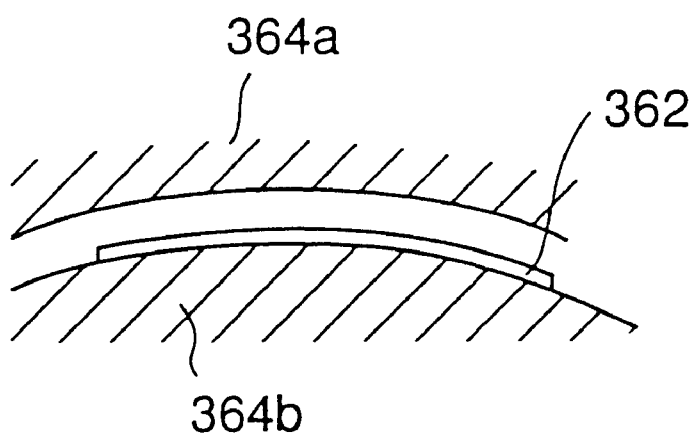
FIGS. 39A and 39B are cross-sectional diagrams showing a twenty-first embodiment of the coordinate input pad of the present invention.
Figure 39B:
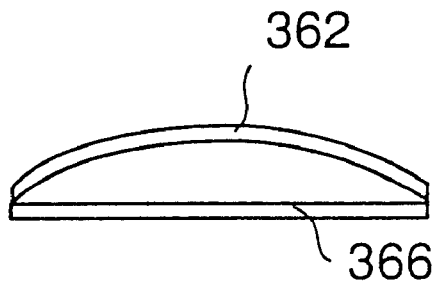

FIGS. 39A and 39B are cross-sectional diagrams showing a twenty-first embodiment of the coordinate input pad of the present invention.

As shown in FIG. 39A, an upper sheet 362 is molded using molds 364a, 364b such that the central part of the upper sheet 362 is bent upwards as in the twentieth embodiment. Then, as shown in FIG. 39B, a lower sheet 366 is joined to the upper sheet 362.

Figure 40A:
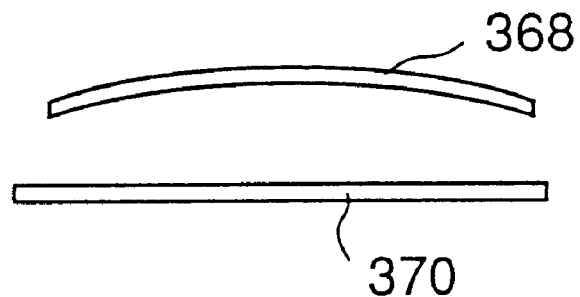
FIGS. 40A to 40C are cross-sectional diagrams showing a twenty-second embodiment of the coordinate input pad of the present invention.
Figure 40B:
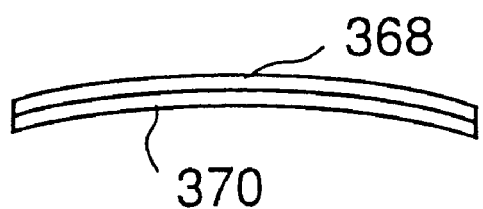
Figure 40C:
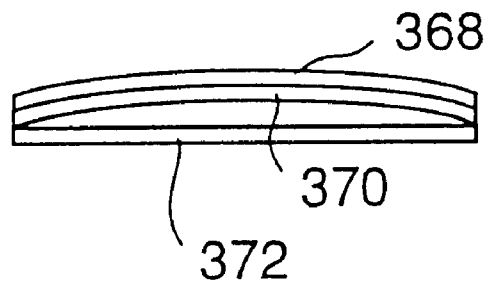

FIGS. 40A to 40C are cross-sectional diagrams showing a twenty-second embodiment of the coordinate input pad of the present invention.

A protective sheet 368 is molded using molds (not shown) such that the central part of the protective sheet 368 is bent upwards as in the twentieth embodiment. Then, as shown in FIG. 40B, the protective sheet 368 is provided on an upper surface of an upper sheet 370 so that the upper sheet 370 is bent upwards. Finally, as shown in FIG. 40C, a lower sheet 372 is joined to the upper sheet 370.

FIGS. 41A to 41D are cross-sectional diagrams showing a twenty-third embodiment of the coordinate input pad of the present invention.

In the twenty-third embodiment, an upper sheet 374 is configured as a multilayer sheet having a plurality of layers, i.e., a first layer 374a and a second layer 374b, of different coefficients of thermal expansion. The upper sheet 374 is placed under operating temperature so that, when folded, its central part is bent upwards. Then, a lower sheet 376 is joined to the upper sheet 374.

Figure 41A:
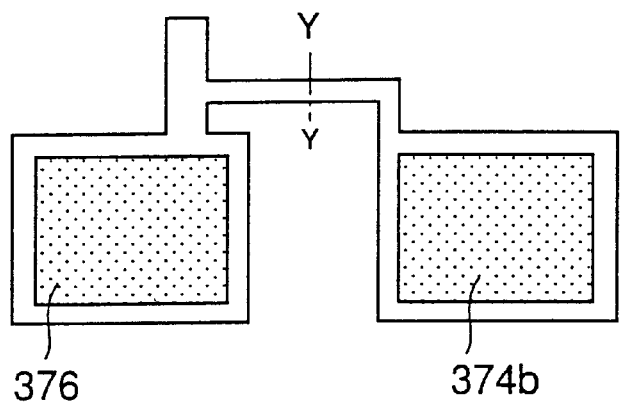
FIGS. 41A to 41D are cross-sectional diagrams showing a twenty-third embodiment of the coordinate input pad of the present invention.

The coordinate input pad of the twenty-third embodiment can be manufactured as follows. As shown in FIG. 41A, which is a development view of the coordinate input pad, a second layer 374b of the upper sheet 374 and the lower sheet 376 provided with resistive film patterns, wiring patterns, resist patterns and adhesive layer patterns are stamp out from a single sheet.

Figure 41B:
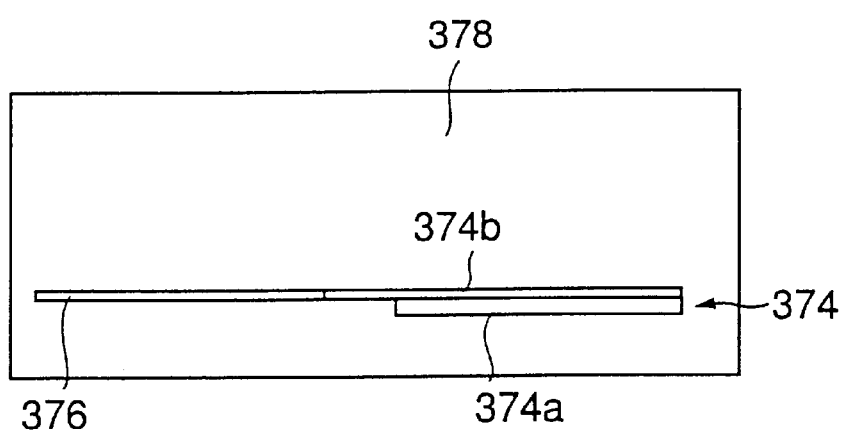

Then, a first layer 374a of the upper sheet 374 is prepared separately from the stamped-out structure. As shown in FIG. 41B, the second layer 374b and the lower sheet 376, which are in an unfolded state, and the first layer 374a are placed in a thermostatic chamber 378 at about −20 to −30° C. until a thermostatic state is reached. Here, the second layer 374b of the upper sheet 374 and the lower sheet 376 are made of a PET film having a coefficient of thermal expansion of approximately $3\times10^{-5}/°$ C. and a thickness of approximately 0.1 mm. The first layer 374a of the upper sheet 374 is made from a sheet material having a greater coefficient of thermal expansion compared to that of the PET film. For example, the first layer 374a of the upper sheet 374 is made of a polycarbonate film having a coefficient of thermal expansion of approximately $6\times10^{-5}/°$ C. and a thickness of approximately 0.1 mm.

Then, in the thermostatic chamber 378, the first layer 374a is provided on the operating surface (a surface on an opposite side of the surface shown in FIG. 41A) of the second layer 374b, so as to form a double-layered sheet.

Figure 41C:
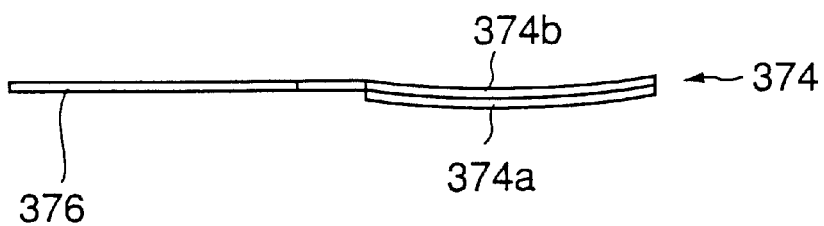

Subsequently, the sheet provided with the first layer 374a is removed from the thermostatic chamber 378 and placed under room temperature. As a result, as shown in FIG. 41C, the central part of the upper sheet 374 will be bent upwards. This is because the second layer 374a has a relatively large coefficient of thermal expansion, so that after it has been contracted in the thermostatic chamber 378, it will experience a greater thermal expansion than the second layer 374b when placed in a higher temperature such as the room temperature.

Figure 41D:
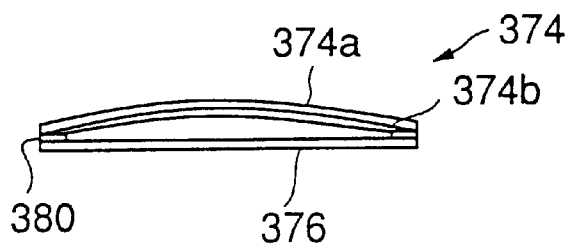

As shown in FIG. 41D, the coordinate input pad of the twenty-third embodiment is completed by folding the sheet along a line Y—Y shown in FIG. 41A, and then joining the upper and lower sheets 374, 376 by means of an adhesive film 380.

Figure 42A:
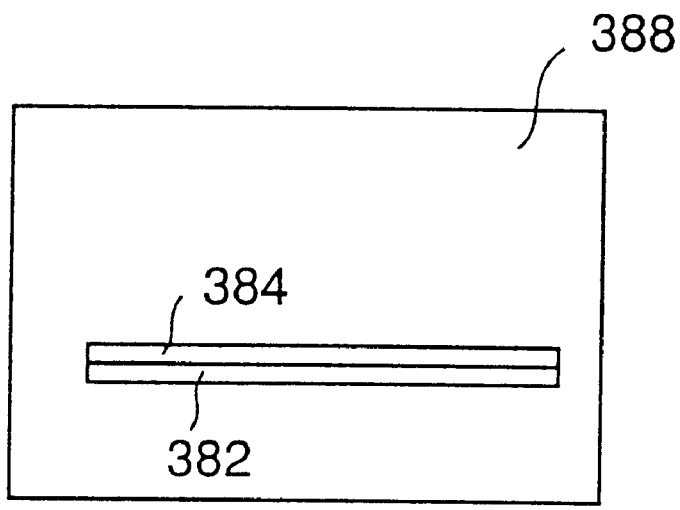
FIGS. 42A to 42C are cross-sectional diagrams showing a twenty-fourth embodiment of the coordinate input pad of the present invention.
Figure 42B:
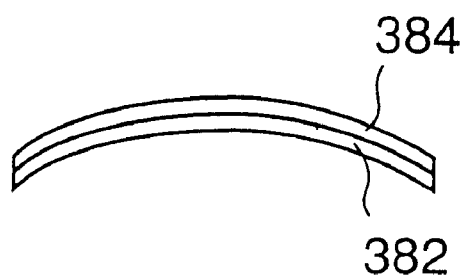
Figure 42C:
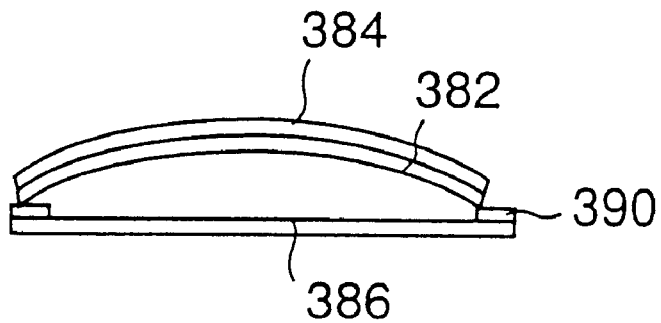

FIGS. 42A to 42C are cross-sectional diagrams showing a twenty-fourth embodiment of the coordinate input pad of the present invention.

In the twenty-fourth embodiment, an upper sheet 382 is provided with a protective sheet 384 having a coefficient of thermal expansion different from that of the upper sheet 382. At operating temperature, the upper sheet 382 is bent such that its central part is raised. Then, a lower sheet 386 is joined to the upper sheet 382.

The coordinate input pad of the twenty-fourth embodiment can be manufactured as follows. The upper sheet 382 is made of a material having a comparatively large coefficient of thermal expansion, such as a polycarbonate film, having a thickness of approximately 0.1 mm. The protective sheet 384 is made of a material having a comparatively low coefficient of thermal expansion, such as a PET film, having a thickness of approximately 0.1 mm.

As shown in FIG. 42A, the upper sheet 382 and the protective sheet 384 are placed in a thermostatic chamber 388 at a high temperature of about 70 to 100° C. for about an hour until a thermostatic state is reached. Then, the upper sheet 382 and the protective sheet 384 are joined together in the thermostatic chamber 388.

Subsequently, the upper sheet 382 joined together with the protective sheet 384 is removed from the thermostatic chamber 388 and placed under room temperature. As a result, as shown in FIG. 42B, the central part of the upper sheet 382 will be bent upwards. This is because the upper sheet 382 has a relatively large coefficient of thermal expansion, so that it expands to a greater extent in the thermostatic chamber 388. Therefore, the upper sheet 382 will experience a greater contraction than the protective sheet 384 when placed in a lower temperature such as room temperature.

As shown in FIG. 42C, the coordinate input pad of the twenty-fourth embodiment is completed by joining the upper sheet 382 provided with the protective sheet 382 onto the lower sheet 386 by means of an adhesive film 390.

FIGS. 43A to 43D are cross-sectional diagrams showing a twenty-fifth embodiment of the coordinate input pad of the present invention.

In the twenty-fifth embodiment, an upper sheet 392 is provided with a protective sheet 394 having a coefficient of thermal expansion different from that of the upper sheet 392. At operating temperature, the upper sheet 392 is bent such that its central part is raised. Then, a lower sheet 396 is joined to the upper sheet 392 by means of an adhesive film 398.

The coordinate input pad of the twenty-fifth embodiment can be manufactured as follows. A base layer 394a of the protective sheet 394 is made of a PET film having a thickness of 100 μm. The base layer 394a is provided first, and then second hard coating layers 394b, 394c made of a material such as an acrylate resin provided on either side of the base layer 394a. The second hard coating layer 394c provided on the lower surface of the base layer 394a has a greater thickness compared to that of the first hard coating layer 394b provided on the upper surface of the base layer 394a. The hard coating layers 394a, 394b may be formed by applying an acrylate resin material of an UV-curing type, and then curing by means of an UV-radiation.

Figure 43A:
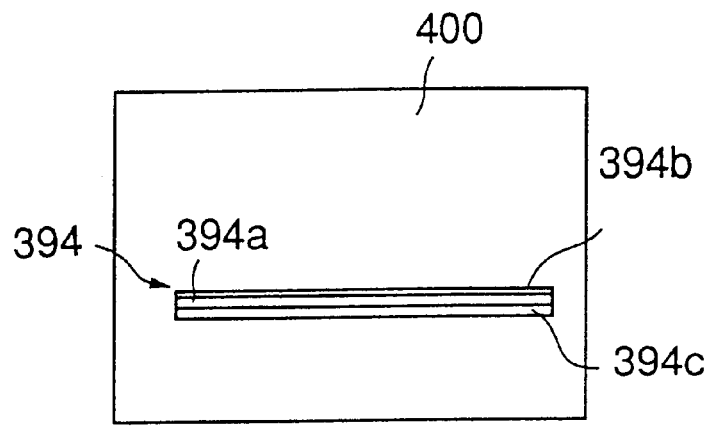
FIGS. 43A to 43D are cross-sectional diagrams showing a twenty-fifth embodiment of the coordinate input pad of the present invention.
Figure 43B:
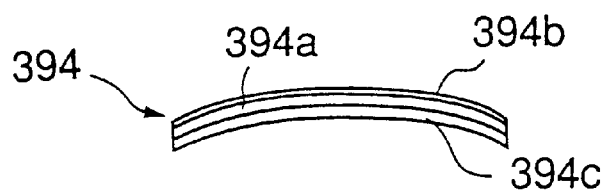

It is to be noted that the hard coating layers 394b, 394c after the UV-curing may experience a reduction of volume due to further polymerization caused by further heating. Thus, generally, the hard coating layers 394b, 394c experienced greater contraction due to heat. Also, the hard coating layer 394c of a greater thickness experiences greater contraction compared to the hard coating layer 394b. Therefore, as shown in FIG. 43A, when the protective sheet 394 is placed in an atmosphere at a high temperature (e.g., about 70 to 100° C.) for about an hour, the central part of the protective sheet 394 will be bent upwards. Since the heat contraction is irreversible, the protective sheet 394 remains bent under room temperature (see FIG. 43B).

Figure 43C:
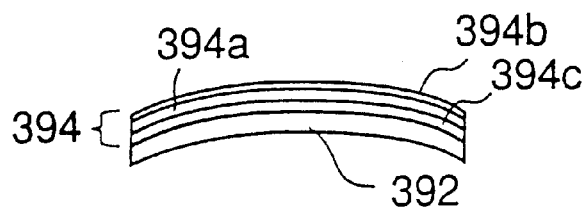
Figure 43D:
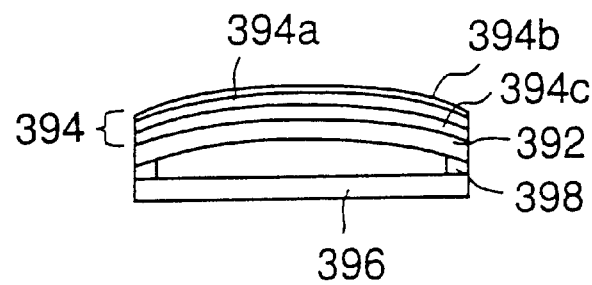

As shown in FIG. 43C, the upper sheet 392 made of a material such as a PET film is joined to the protective sheet 394, so that the central part of the upper sheet 392 is bent upwards according to the shape of the protective sheet 394. Finally, the coordinate input pad of the twenty-fifth embodiment is completed by joining the upper sheet 392 onto the lower sheet 396 by means of the adhesive film 398.

Figure 44A:
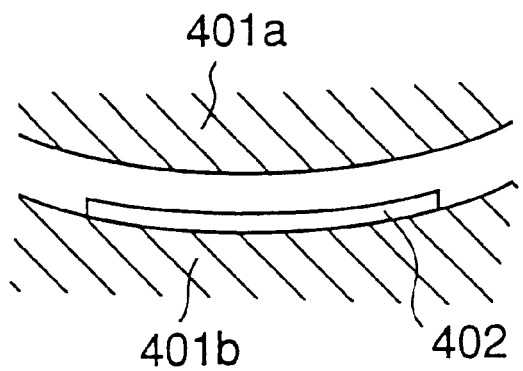
FIGS. 44A and 44B are cross-sectional diagrams showing a twenty-sixth embodiment of the coordinate input pad of the present invention.
Figure 44B:
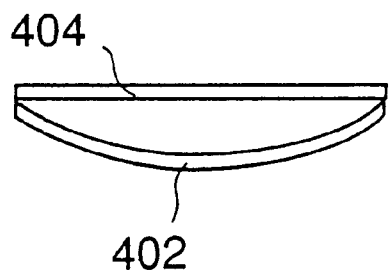

FIGS. 44A and 44B are cross-sectional diagrams showing a twenty-sixth embodiment of the coordinate input pad of the present invention.

The coordinate input pad of the twenty-sixth embodiment is different from the coordinate input pad of the seventeenth to twenty-fifth embodiments in that the central part of a lower sheet 402 is bent downwards instead of the central part of an upper sheet 404 being bent upwards. The lower sheet 402 is formed in a similar manner to the upper sheet 362 of the twenty-first embodiment. That is to say, as shown in FIG. 44A, the lower sheet 404 is molded using molds 401a, 401b such that the central part of the lower sheet 404 is bent downwards. Then, as shown in FIG. 44B, a lower sheet 402 is joined to the upper sheet 404.

Figure 45:
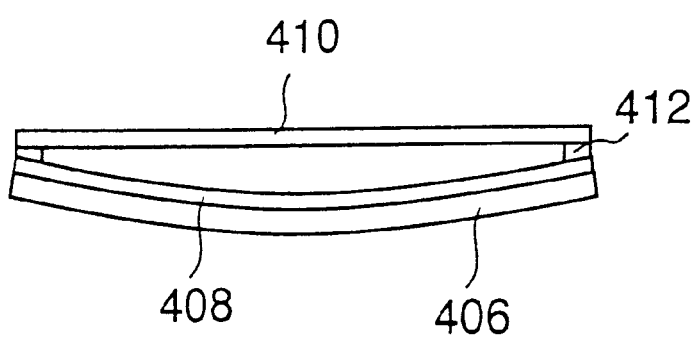
FIG. 45 is a cross-sectional diagram showing a twenty-seventh embodiment of the coordinate input pad of the present invention.

FIG. 45 is a cross-sectional diagram showing a twenty-seventh embodiment of the coordinate input pad of the present invention. In the twenty-seventh embodiment, the central part of a mounting board 406 is bent downwards. Then, a lower surface of a lower sheet 408 is provided on the mounting board 406, so that the central part of the lower sheet 408 is bent downwards. Finally, an upper sheet 410 is joined to the lower sheet 408 by means of an adhesive film 412.

Figure 46:
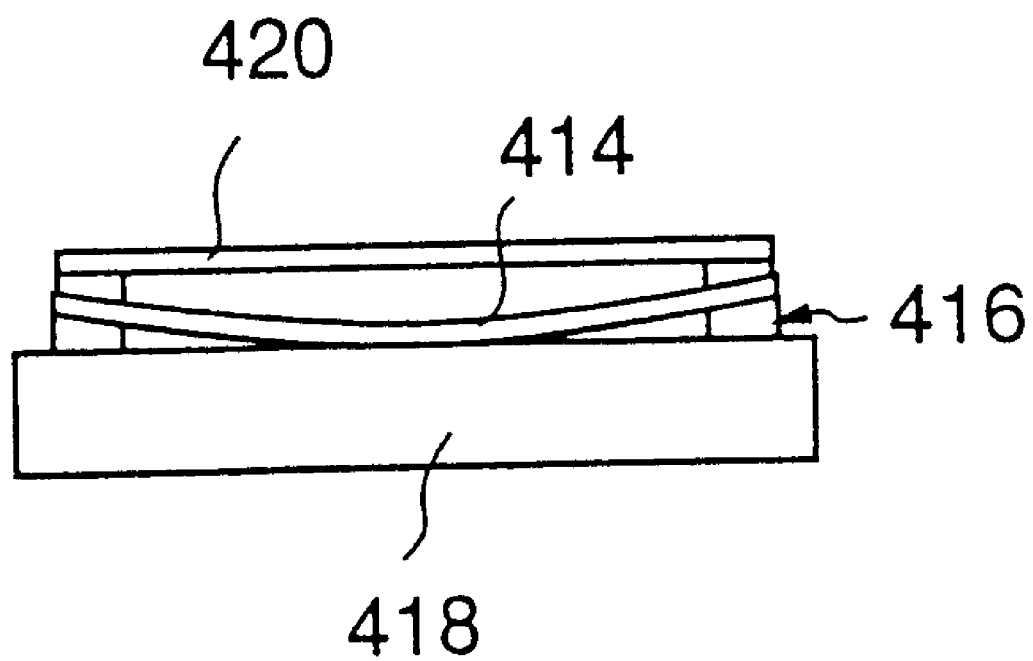
FIG. 46 is a cross-sectional diagram showing a twenty-eighth embodiment of the coordinate input pad of the present invention.

FIG. 46 is a cross-sectional diagram showing a twenty-eighth embodiment of the coordinate input pad of the present invention. In the twenty-eighth embodiment, a lower sheet 414 is provided on a mounting board 418 by means of a frame-like adhesive film 416 provided on a lower surface of the lower sheet 414 and formed as a thick film. Then, an upper sheet 420 may be provided on the lower sheet 414 with the central part of the lower sheet 414 being bent downwards.

With the coordinate input pads of the eighteenth to twenty-eighth embodiments, it is possible to obtain an effect similar to that of the coordinate input pad of the seventeenth embodiment.

Figure 47:
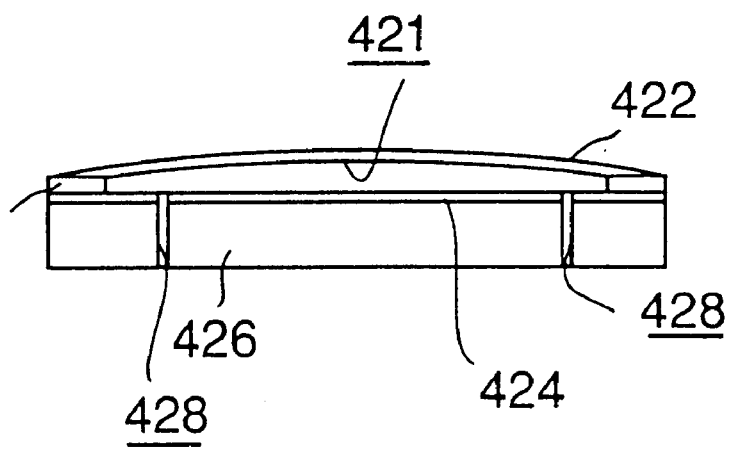
FIG. 47 is a cross-sectional diagram showing a twenty-ninth embodiment of the coordinate input pad of the present invention.

FIG. 47 is a cross-sectional diagram showing a twenty-ninth embodiment of the coordinate input pad of the present invention. The coordinate input pad of the twenty-ninth embodiment includes an upper sheet 422 and a lower sheet 424 opposing each other at a predetermined gap. The lower sheet 424 is provided on a mounting board 426 and communicating holes 428 are provided through the lower sheet 424 and the mounting board 426. A cavity 421 is formed between the upper sheet 422 and the lower sheet 424 which are joined together by means of an adhesive film 427. The communicating holes 428 establish a communication between the cavity 421 and external air.

With the coordinate input pad of the related art, the air does not freely communicate between the cavity between the upper and lower sheets and external air. Therefore, since not enough air will immediately flow back to the cavity, the upper and lower sheets remain in contact for a considerable time even if the pressure on the coordinate input pad is released. However, with the coordinate input pad of the twenty-ninth embodiment, an air communication is established between the cavity 421 and the external air according to a pressure on the coordinate input pad. Therefore, when the pressure is released, the upper and lower sheets 422, 424 will return to the original state in which the upper and lower sheets 422, 424 oppose each other at a predetermined gap.

Therefore, with the coordinate input pad of the twenty-ninth embodiment, it is possible to avoid a problem caused in the related art, in which problem detected data becomes unstable due to the fact that the upper and lower sheets remain in contact for a considerable time even if the pressure on the coordinate input pad is released. Therefore, accurate coordinate data can be detected at any point on the operating surface of the coordinate input pad.

Figure 48:
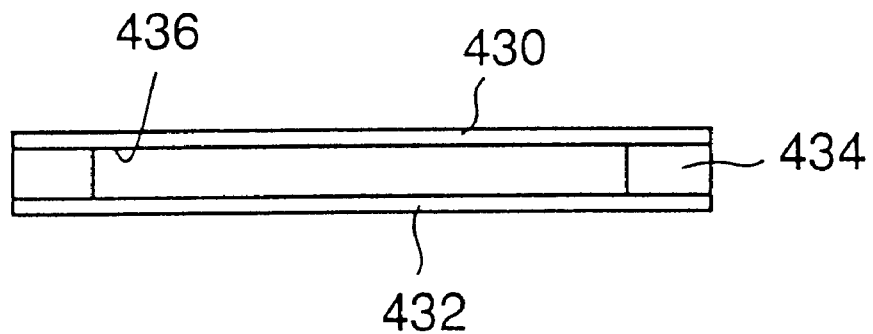
FIG. 48 is a cross-sectional diagram showing a thirtieth embodiment of the coordinate input pad of the present invention.

FIG. 48 is a cross-sectional diagram showing a thirtieth embodiment of the coordinate input pad of the present invention. The coordinate input pad of the thirtieth embodiment is not provided with communication holes as in the twenty-ninth embodiment. The coordinate input pad of the thirtieth embodiment is provided with a frame-like adhesive film 434 which is separate from the upper and lower sheets 430, 432 and is a thick film having a thickness of over 50 μm. The upper sheet 430 and the lower sheet 432 are joined together via the adhesive film 434 and a sealed cavity 436 is formed between the upper and lower sheets 430, 432.

Therefore, with the coordinate input pad of the thirtieth embodiment, since no air escapes from the cavity 436 to the external air, it is possible to avoid a problem caused in the related art, in which problem detected data becomes unstable due to the fact that the upper and lower sheets remain in contact for a considerable time even if the pressure on the coordinate input pad is released. Therefore, accurate coordinate data can be detected at any point on the operating surface of the coordinate input pad, and it is possible to obtain an effect similar to that of the coordinate input pad of the twenty- seventh embodiment.

Further, the present invention is not limited to these embodiments, but variations and modifications may be made without departing from the scope of the present invention.

The present application is based on Japanese priority application No. 10-109172 filed on Apr. 20, 1998 and No. 11-17618 filed on Jan. 26, 1999, the entire contents of which are hereby incorporated by reference.

What is claimed is:

1. A coordinate-detecting device of a voltage-detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein said upper sheet and said lower sheet oppose each other at said predetermined gap by a repulsive force between magnetic poles with the same polarity.

2. The coordinate-detecting device as claimed in claim 1, wherein each of said upper and lower sheets includes a resin film and a magnetic printed layer provided on one of the surfaces of said resin film, and is further laminated with a resistive film, electrode patterns and wiring patterns, said magnetic printed layer being provided by uniformly screen-printing paste dispersed with a hard magnetic material, and said magnetic printed layers are positioned such that said magnetic poles with the same polarity oppose each other.

3. The coordinate-detecting device as claimed in claim 1, wherein each of said upper and lower sheets includes a resin film and a resistive film provided on one of the surfaces of said resin film, and is further laminated with electrode patterns and wiring patterns, said resistive film being provided by uniformly printing resistive film-print paste dispersed with a hard magnetic material, and said resistive films are positioned such that said magnetic poles with the same polarity oppose each other.

4. The coordinate-detecting device as claimed in claim 1, wherein each of said upper and lower sheets includes a resin film and a hard magnetic thin film provided on one of the surfaces of said resin film, and is further laminated with a resistive film, electrode patterns and wiring patterns, said resistive film being provided by vapor deposition, and said hard magnetic thin films are positioned such that said magnetic poles with the same polarity oppose each other.

5. The coordinate-detecting device as claimed in claim 1, wherein each of said upper and lower sheets includes a film laminated with a resistive film, electrode patterns and wiring patterns, said film being provided with particles of a hard magnetic material mixed therein, and said sheets are positioned such that said magnetic poles with the same polarity oppose each other.

6. The coordinate-detecting device as claimed in claim 1, wherein said upper sheet includes a resin film and a magnetic printed layer provided on one of the surfaces of said resin film, the other surface of said resin film being laminated with a resistive film, electrode patterns and wiring patterns, said magnetic printed layer being provided by uniformly screen-printing paste dispersed with a hard magnetic material;

said lower sheet includes a magnetic printed layer provided on a printed board, said magnetic printed layer being laminated with a resin film, a resistive film, electrode patterns and wiring patterns, said magnetic printed layer being provided by uniformly screen-printing paste dispersed with a hard magnetic material, and said magnetic printed layers are positioned such that said magnetic poles with the same polarity oppose each other.

7. The coordinate-detecting device as claimed in claim 1, wherein said upper sheet includes a film laminated with a resin film, a resistive film, electrode patterns and wiring patterns, said film being provided with particles of a hard magnetic material mixed therein;

said lower sheet is laminated with a resin film, a resistive film, electrode patterns and wiring patterns, said lower sheet being provided on a printed board, and said film provided on the upper sheet and said printed board are positioned such that said magnetic poles with the same polarity oppose each other.

8. The coordinate-detecting device as claimed in claim 1,
wherein each of said upper and lower sheets includes a resin film and a plurality of printed film magnets provided on one of the surfaces of said resin film, the printed film magnets or the other surface of the resin film being laminated with a resistive film, electrode patterns and wiring patterns, and said plurality of printed film magnets are magnetized in a thickness direction and are positioned such that said magnetic poles with the same polarity oppose each other.

9. The coordinate-detecting device as claimed in claim 1,
wherein each of said upper and lower sheets includes a resin film and a plurality of printed film magnets provided on one of the surfaces of said resin film, the plurality of printed film magnets or the other surface of the resin film being laminated with a resistive film, electrode patterns and wiring patterns, and said plurality of printed film magnets are magnetized in a transverse direction and are positioned such that said magnetic poles with the same polarity oppose each other.

10. The coordinate-detecting device as claimed in claim 1,
wherein each of said upper and lower sheets includes a resin film and a printed film magnet provided at a central position of one of the surfaces of said resin film, the printed film magnet or the other surface of the resin film being laminated with a resistive film, electrode patterns and wiring patterns, and said printed film magnet is magnetized in a thickness direction and is positioned such that said magnetic poles with the same polarity oppose each other.

11. The coordinate-detecting device as claimed in claim 1,
wherein each of said upper and lower sheets includes a resin film and a plurality of printed film magnets provided at a central position of one of the surfaces of said resin film, the plurality of printed film magnets or the other surface of the resin film being laminated with a resistive film, electrode patterns and wiring patterns, and said plurality of printed film magnets are magnetized in a transverse direction and are positioned such that said magnetic poles with the same polarity oppose each other.

12. The coordinate-detecting device as claimed in claim 1,
wherein said upper sheet includes a resin film and a printed film magnet provided at a central position of one of the surfaces of said resin film, the printed film magnet or on the other surface of the resin film being laminated with a resistive film, electrode patterns and wiring patterns, said lower sheet includes a resin film laminated with a resistive film, electrode patterns and wiring patterns, said coordinate-detecting device further comprises a permanent magnet mounted on a printed board at a central position of an operating area, and said printed film magnet is magnetized in a thickness direction and is positioned with respect to said permanent magnet such that said magnetic poles with the same polarity oppose each other.

13. The coordinate-detecting device as claimed in claim 1,
wherein said upper sheet includes a resin film and a printed film magnet provided at a central position of one of the surfaces of said resin film, the printed film magnet or the other surface of the resin film being further laminated with a resistive film, electrode patterns and wiring patterns, said lower sheet includes a resin film laminated with a resistive film, electrode patterns and wiring patterns, said coordinate-detecting device further comprises a coil pattern, which can serve as a magnet, provided on a printed board at a central position of an operating area, and said printed film magnet is magnetized in a thickness direction and is positioned with respect to said coil pattern such that magnetic poles with the same polarity oppose each other.

14. The coordinate-detecting device as claimed in claim 1,
wherein each of said upper and lower sheets includes a resin film and a coil pattern, which can serve as a magnet, provided at a central position of one of the surfaces of said resin film, the coil pattern or the other surface of the resin film being laminated with a resistive film, electrode patterns and wiring patterns, and said coil patterns are positioned such that said magnetic poles with the same polarity oppose each other.

15. A coordinate-detecting device of a voltage detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein said upper sheet and said lower sheet oppose each other at said predetermined gap by a tension in the upper sheet.

16. The coordinate-detecting device as claimed in claim 15,
wherein said upper sheet and said lower sheet are joined together via spacers provided at peripheral parts of the sheets, in order to produce said tension in the upper sheet.

17. The coordinate-detecting device as claimed in claim 15,
wherein said upper sheet and said lower sheet are joined together with the upper sheet being attached to an attachment housing, in order to produce said tension in the upper sheet.

18. The coordinate-detecting device as claimed in claim 15,
wherein said upper sheet is attached on guide pins provided upright on a mounting board on which said lower sheet is provided, in order to produce said tension in the upper sheet.

19. The coordinate-detecting device as claimed in claim 15,
wherein, peripheral parts of the upper sheet are attached to an attachment housing via elastic members, in order to produce said tension in the upper sheet.

20. A coordinate-detecting device of a voltage-detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein said upper sheet and said lower sheet oppose each other at said predetermined gap by a central part of the upper sheet being bent upwards.

21. The coordinate-detecting device as claimed in claim 20, wherein a protective sheet is provided on an upper surface of said upper sheet with the upper sheet being tensed, and said central part of the upper sheet is bent upwards as a result of a contraction of the upper sheet.

22. The coordinate-detecting device as claimed in claim 20, wherein a double-sided adhesive tape is provided on a lower surface of a protective sheet with the double-sided adhesive tape being tensed, the central part of the protective sheet is bent upwards as a result of a contraction of the double-sided adhesive tape, and the double-sided adhesive tape having the protective film is provided on an upper surface of the upper sheet, such that said central part of the upper sheet is bent upwards.

23. The coordinate-detecting device as claimed in claim 20, wherein the upper sheet is molded such that said central part of the upper sheet is bent upwards.

24. The coordinate-detecting device as claimed in claim 20, wherein a protective sheet is molded such that a central part of the protective sheet is bent upwards, and the protective sheet is provided on an upper surface of the upper sheet such that said central part of the upper sheet is bent upwards.

25. The coordinate-detecting device as claimed in claim 20, wherein the upper sheet is configured as a multilayer sheet having a plurality of layers of different coefficients of thermal expansion such that, at operating temperature, said central part of the upper sheet is bent upwards.

26. The coordinate-detecting device as claimed in claim 20, wherein the upper sheet is configured as a multilayer sheet having a plurality of layers of different coefficients of thermal contraction such that, at operating temperature, said central part of the upper sheet is bent upwards.

27. The coordinate-detecting device as claimed in claim 20, wherein a protective sheet having a different coefficient of thermal expansion from that of the upper sheet is provided on the upper sheet such that, at operating temperature, said central part of the upper sheet is bent upwards.

28. The coordinate-detecting device as claimed in claim 20, wherein a protective sheet having a plurality of layers of different coefficients of thermal contraction is provided on the upper sheet such that, at operating temperature, said central part of the upper sheet is bent upwards.

29. A coordinate-detecting device of a voltage-detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein said upper sheet and said lower sheet oppose each other at said predetermined gap by a central part of the lower sheet being bent downwards.

30. The coordinate-detecting device as claimed in claim 29, wherein the lower sheet is molded such that said central part of the lower sheet is bent downwards.

31. The coordinate-detecting device as claimed in claim 29, wherein a lower surface of the lower sheet is provided on a mounting board, which is bent downwards at a central part, such that said central part of the lower sheet is bent downwards.

32. The coordinate-detecting device as claimed in claim 29, wherein the lower sheet is provided on a mounting board via a frame-like adhesive film provided on a lower surface of the lower sheet, such that said central part of the lower sheet is bent downwards.

33. A coordinate-detecting device of a voltage-detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein a cavity formed between said upper sheet and said lower sheet opposing each other at said predetermined gap, and said lower sheet is provided on a mounting board, communicating holes being provided through the lower sheet and the mounting board for establishing a communication between the cavity and external air, said communication being established depending on a state of pressure on said coordinate input pad.

34. A coordinate-detecting device of a voltage-detecting type, said device comprising:

a coordinate input pad having an upper sheet and a lower sheet opposing each other at a predetermined gap, said sheets being in electrical contact when there is a touch on the coordinate input pad;

a voltage-detecting part for alternately detecting voltage values representing an X-coordinate and a Y-coordinate of a contact point; and a control part for generating coordinate data from said voltage values detected at the voltage-detecting part, wherein said upper sheet and said lower sheet oppose each other at said predetermined gap by said upper and lower sheets being joined together via a frame-like adhesive film of a thick-film type, a sealed cavity being formed between the upper and lower sheets.

35. A coordinate input pad used in a coordinate-detecting device of a voltage-detecting type, said coordinate input pad comprising an upper sheet and a lower sheet, wherein said upper sheet and said lower sheet oppose each other at a predetermined gap by a repulsive force between magnetic poles with the same polarity.

36. A coordinate input pad used in a coordinate-detecting device of a voltage-detecting type, said coordinate input pad comprising an upper sheet and a lower sheet, wherein said upper sheet and said lower sheet are joined together via spacers provided at peripheral parts of the sheets, in order to produce a tension in the upper sheet.

37. A coordinate input pad used in a coordinate-detecting device of a voltage-detecting type, said coordinate input pad comprising an upper sheet and a lower sheet, wherein said upper sheet and said lower sheet oppose each other at a predetermined gap by a central part of the upper sheet being bent upwards.

38. A coordinate input pad used in a coordinate-detecting device of a voltage-detecting type, said coordinate input pad comprising an upper sheet and a lower sheet, wherein said upper sheet and said lower sheet oppose each other at a predetermined gap by a central part of the lower sheet being bent downwards.

39. A coordinate-detecting device of a voltage-detecting type, comprising:

an input pad having a first sheet and a second sheet separated by a gap, said sheets being in contact when there is a touch on the input pad, wherein said first sheet and said second sheet oppose each other at said gap by a repulsive force between magnetic poles with a same polarity.

40. A coordinate-detecting device of a voltage-detecting type, comprising:

an input pad having a first sheet and a second sheet separated by a gap, said sheets being in contact when there is a touch on the input pad, wherein said first sheet and said second sheet oppose each other at said gap by a tension in said first sheet.

41. A coordinate-detecting device of a voltage-detecting type, comprising:

an input pad having a first sheet and a second sheet separated by a gap, said sheets being in contact when there is a touch on the input pad, wherein said first sheet and said second sheet oppose each other at said gap by a central part of said first sheet being bent upwards.

\* \* \* \* \*

UNITED STATES PATENT AND TRADEMARK OFFICE
CERTIFICATE OF CORRECTION

PATENT NO. : 6,369,806 B1
DATED : April 9, 2002
INVENTOR(S) : Michiko Endo et al.

It is certified that error appears in the above-identified patent and that said Letters Patent is hereby corrected as shown below:

<u>Column 25,</u>
Line 4, change "surf aces" to -- surfaces --.

Signed and Sealed this

Fourth Day of June, 2002

Attest:

Attesting Officer

JAMES E. ROGAN
*Director of the United States Patent and Trademark Office*